(12) United States Patent
Jinka et al.

(10) Patent No.: US 12,220,659 B2
(45) Date of Patent: *Feb. 11, 2025

(54) ELECTRET-CONTAINING FILTER MEDIA

(71) Applicant: Hollingsworth & Vose Company, East Walpole, MA (US)

(72) Inventors: Sudheer Jinka, Nashua, NH (US); Bruce Smith, Copper Hill, VA (US); Mark A. Gallimore, Floyd, VA (US)

(73) Assignee: Hollingsworth & Vose Company, East Walpole, MA (US)

( * ) Notice: Subject to any disclaimer, the term of this patent is extended or adjusted under 35 U.S.C. 154(b) by 129 days.

This patent is subject to a terminal disclaimer.

(21) Appl. No.: 17/079,394

(22) Filed: Oct. 23, 2020

(65) Prior Publication Data

US 2021/0178304 A1    Jun. 17, 2021

Related U.S. Application Data

(63) Continuation of application No. 15/438,028, filed on Feb. 21, 2017, now Pat. No. 10,814,261.

(51) Int. Cl.
*B01D 46/00* (2022.01)
*B01D 39/16* (2006.01)
*B03C 3/28* (2006.01)

(52) U.S. Cl.
CPC ..... *B01D 46/0032* (2013.01); *B01D 39/1623* (2013.01); *B03C 3/28* (2013.01);
(Continued)

(58) Field of Classification Search
CPC ............ B01D 46/0032; B01D 39/1623; B01D 2239/0435; B01D 2239/0654;
(Continued)

(56) References Cited

U.S. PATENT DOCUMENTS 3,298,080 A * 1/1967 Smith, II ................. D04H 1/46
28/108
3,476,636 A * 11/1969 Crosby .................. D04H 1/498
442/352
(Continued)

FOREIGN PATENT DOCUMENTS

CN  1688377 A  10/2005
CN  105013248 A  11/2015
(Continued)

OTHER PUBLICATIONS

International Search Report and Written Opinion for PCT/US2018/018924 mailed Jun. 25, 2018.
(Continued)

*Primary Examiner* — Christopher P Jones
*Assistant Examiner* — Sonji Turner
(74) *Attorney, Agent, or Firm* — Wolf, Greenfield & Sacks, P.C.

(57) ABSTRACT

Filter media, such as electret-containing filtration media for filtering gas streams (e.g., air), are described herein. In some embodiments, the filter media may be designed to have desirable properties such as stable filtration efficiency over the lifetime of the filter media, increased normalized gamma, relatively low pressure drop (i.e. resistance), and/or relatively low basis weight. In certain embodiments, the filter media may be a composite of two or more types of fiber layers where each layer may be designed to enhance its function without substantially negatively impacting the performance of another layer of the media. For example, one layer of the media may be designed to have a relatively low basis weight and/or a relatively high air permeability, and another layer of the media may be designed to have stable filtration efficiency and/or a relatively high efficiency throughout the filter media's lifetime. The filter media described herein may be particularly well-suited for appli-
(Continued)

cations that involve filtering gas streams (e.g., face masks, cabin air filtration, vacuum filtration, room filtration, furnace filtration, respirator equipment, residential or industrial HVAC filtration, high-efficiency particulate arrestance (HEPA) filters, ultra-low particular air (ULPA) filters, medical equipment), though the media may also be used in other applications.

28 Claims, 10 Drawing Sheets

(52) U.S. Cl.
CPC ............... B01D 2239/0435 (2013.01); B01D 2239/0654 (2013.01); B01D 2239/0659 (2013.01); B01D 2239/069 (2013.01); B01D 2239/1233 (2013.01); B01D 2239/1258 (2013.01); B01D 2239/1291 (2013.01)

(58) Field of Classification Search
CPC ...... B01D 2239/0659; B01D 2239/069; B01D 2239/1233; B01D 2239/1258; B01D 2239/1291; B03C 3/28
See application file for complete search history.

(56) References Cited

U.S. PATENT DOCUMENTS

| | | | | |
|---|---|---|---|---|
| 3,570,085 | A * | 3/1971 | Heinemann | D04H 1/498 28/112 |
| 3,675,403 | A | 7/1972 | Ruffo | |
| 4,324,574 | A * | 4/1982 | Fagan | D04H 1/4218 442/36 |
| 4,650,506 | A * | 3/1987 | Barris | D01D 5/0084 55/528 |
| 4,874,399 | A * | 10/1989 | Reed | B01D 39/1623 55/DIG. 35 |
| 4,983,434 | A | 1/1991 | Sassa | |
| 5,084,178 | A | 1/1992 | Miller et al. | |
| 5,230,800 | A * | 7/1993 | Nelson | B01D 39/1623 264/441 |
| 5,277,976 | A | 1/1994 | Hogle et al. | |
| 5,460,872 | A | 10/1995 | Wu et al. | |
| 5,496,507 | A | 3/1996 | Angadjivand et al. | |
| 5,580,459 | A | 12/1996 | Powers et al. | |
| 5,672,399 | A | 9/1997 | Kahlbaugh et al. | |
| 5,785,725 | A | 7/1998 | Cusick et al. | |
| 5,792,242 | A * | 8/1998 | Haskett | B32B 5/022 55/528 |
| 5,800,769 | A * | 9/1998 | Haskett | B01D 39/086 264/DIG. 48 |
| 5,855,783 | A | 1/1999 | Shucosky et al. | |
| 5,898,981 | A * | 5/1999 | Legare | B01D 39/08 28/107 |
| 5,908,598 | A | 6/1999 | Rousseau et al. | |
| 5,919,847 | A | 7/1999 | Rousseau et al. | |
| 5,968,635 | A | 10/1999 | Rousseau et al. | |
| 5,976,208 | A | 11/1999 | Rousseau et al. | |
| 5,979,030 | A * | 11/1999 | Legare | B32B 5/26 264/DIG. 48 |
| 6,002,017 | A | 12/1999 | Rousseau et al. | |
| 6,030,428 | A | 2/2000 | Ishino et al. | |
| 6,090,469 | A * | 7/2000 | Wadsworth | B03C 3/28 442/357 |
| 6,171,684 | B1 | 1/2001 | Kahlbaugh et al. | |
| 6,200,368 | B1 | 3/2001 | Guerin et al. | |
| 6,211,100 | B1 * | 4/2001 | Legare | B32B 5/06 442/388 |
| 6,213,122 | B1 | 4/2001 | Rousseau et al. | |
| 6,214,094 | B1 | 4/2001 | Rousseau et al. | |
| 6,238,466 | B1 | 5/2001 | Rousseau et al. | |
| 6,261,342 | B1 | 7/2001 | Rousseau et al. | |
| 6,268,495 | B1 | 7/2001 | Rousseau et al. | |
| 6,397,458 | B1 | 6/2002 | Jones et al. | |
| 6,398,847 | B1 | 6/2002 | Jones et al. | |
| 6,409,806 | B1 | 6/2002 | Jones et al. | |
| 6,432,175 | B1 | 8/2002 | Jones et al. | |
| 6,537,614 | B1 | 3/2003 | Wei et al. | |
| 6,562,112 | B2 | 5/2003 | Jones et al. | |
| 6,623,548 | B1 | 9/2003 | Gordon et al. | |
| 6,627,563 | B1 | 9/2003 | Huberty | |
| 6,660,210 | B2 | 12/2003 | Jones et al. | |
| 6,808,551 | B2 | 10/2004 | Jones et al. | |
| 6,811,594 | B1 | 11/2004 | Collingwood et al. | |
| 6,858,057 | B2 | 2/2005 | Healey | |
| 6,953,544 | B2 | 10/2005 | Jones et al. | |
| 6,966,939 | B2 | 11/2005 | Rammig et al. | |
| 6,986,804 | B2 | 1/2006 | Dominiak et al. | |
| 7,008,465 | B2 | 3/2006 | Graham et al. | |
| 7,137,510 | B1 | 11/2006 | Klein et al. | |
| 7,244,291 | B2 | 7/2007 | Spartz et al. | |
| 7,244,292 | B2 | 7/2007 | Kirk et al. | |
| 7,314,497 | B2 | 1/2008 | Kahlbaugh et al. | |
| 7,717,986 | B2 * | 5/2010 | Lotgerink-Bruinenberg | B60H 3/0608 96/135 |
| 7,883,562 | B2 * | 2/2011 | Healey | B01D 39/2017 55/497 |
| 7,887,889 | B2 | 2/2011 | David et al. | |
| 7,955,688 | B2 | 6/2011 | Hanson et al. | |
| 8,172,092 | B2 * | 5/2012 | Green | B01D 39/1623 210/493.1 |
| 8,197,569 | B2 * | 6/2012 | Healey | B01D 46/521 55/497 |
| 8,202,340 | B2 * | 6/2012 | Healey | B01D 46/522 55/486 |
| 8,257,459 | B2 * | 9/2012 | Healey | B01D 39/1692 55/486 |
| 8,608,817 | B2 * | 12/2013 | Wertz | B01D 39/1623 95/286 |
| 8,882,875 | B2 * | 11/2014 | Healey | B01D 39/1623 55/486 |
| 9,074,301 | B2 | 7/2015 | Chapman | |
| 9,127,363 | B2 | 9/2015 | David et al. | |
| 9,289,632 | B2 | 3/2016 | Takeuchi et al. | |
| 9,375,666 | B2 | 6/2016 | Winters et al. | |
| 9,618,220 | B2 | 4/2017 | Chapman | |
| 9,687,771 | B2 * | 6/2017 | Healey | B01D 39/1692 |
| 9,718,020 | B2 * | 8/2017 | Healey | B01D 39/1623 |
| 9,808,753 | B2 * | 11/2017 | Lise | B31D 5/0082 |
| 10,441,909 | B2 | 10/2019 | Sahbaee et al. | |
| 10,449,474 | B2 | 10/2019 | Smith et al. | |
| 10,525,392 | B2 | 1/2020 | Kobori et al. | |
| 10,561,972 | B2 | 2/2020 | Smith et al. | |
| 10,758,858 | B2 | 9/2020 | Healey et al. | |
| 10,814,261 | B2 | 10/2020 | Jinka et al. | |
| 11,077,394 | B2 | 8/2021 | Smith | |
| 2002/0083837 | A1 * | 7/2002 | Doherty | B01D 46/0035 55/497 |
| 2003/0213109 | A1 | 11/2003 | Neely et al. | |
| 2005/0158559 | A1 | 7/2005 | Martin et al. | |
| 2005/0193696 | A1 | 9/2005 | Muller et al. | |
| 2006/0096263 | A1 | 5/2006 | Kahlbaugh et al. | |
| 2006/0292947 | A1 * | 12/2006 | LaVietes | B01D 39/163 442/49 |
| 2007/0023958 | A1 * | 2/2007 | LaVietes | B01D 39/163 264/257 |
| 2008/0047437 | A1 | 2/2008 | Oo et al. | |
| 2008/0110342 | A1 | 5/2008 | Ensor et al. | |
| 2008/0202078 | A1 * | 8/2008 | Healey | B01D 46/16 55/484 |
| 2008/0217241 | A1 | 9/2008 | Smithies et al. | |
| 2008/0245041 | A1 * | 10/2008 | Choi | B01D 39/163 156/322 |
| 2008/0274312 | A1 | 11/2008 | Schelling et al. | |
| 2009/0093807 | A1 | 4/2009 | Hyde et al. | |
| 2009/0120048 | A1 | 5/2009 | Wertz et al. | |
| 2009/0183475 | A1 | 7/2009 | Dauber et al. | |
| 2009/0255226 | A1 * | 10/2009 | Kohli | B01D 46/02 55/379 |
| 2009/0272084 | A1 | 11/2009 | Healey et al. | |

(56) References Cited

U.S. PATENT DOCUMENTS

| | | |
|---|---|---|
| 2010/0000411 A1* | 1/2010 | Wertz ................. B01D 39/1623 55/486 |
| 2010/0107881 A1* | 5/2010 | Healey ............... B01D 39/1623 55/486 |
| 2010/0181249 A1 | 7/2010 | Green et al. |
| 2010/0307119 A1 | 12/2010 | Leung et al. |
| 2010/0320138 A1 | 12/2010 | Waller et al. |
| 2011/0147976 A1* | 6/2011 | Wertz ................. B01D 39/1623 264/101 |
| 2011/0154790 A1 | 6/2011 | Israel et al. |
| 2011/0162337 A1 | 7/2011 | Healey et al. |
| 2011/0174158 A1 | 7/2011 | Walls et al. |
| 2011/0210081 A1 | 9/2011 | Green et al. |
| 2011/0259813 A1 | 10/2011 | Wertz et al. |
| 2011/0283671 A1 | 11/2011 | Soyama et al. |
| 2012/0097035 A1 | 4/2012 | Chapman |
| 2012/0135234 A1 | 5/2012 | Netravali et al. |
| 2012/0152821 A1 | 6/2012 | Cox et al. |
| 2012/0152824 A1 | 6/2012 | Cox et al. |
| 2012/0304602 A1 | 12/2012 | Healey et al. |
| 2013/0025245 A1 | 1/2013 | Healey |
| 2013/0025806 A1 | 1/2013 | Vallery |
| 2013/0025809 A1 | 1/2013 | Godsay et al. |
| 2013/0108831 A1* | 5/2013 | Wu ........................ D04H 1/54 428/161 |
| 2013/0168893 A1 | 7/2013 | Jaganathan et al. |
| 2013/0197664 A1 | 8/2013 | Ballard et al. |
| 2014/0130469 A1 | 5/2014 | Nagy et al. |
| 2014/0157742 A1 | 6/2014 | Healey et al. |
| 2014/0224727 A1 | 8/2014 | Yu et al. |
| 2014/0235419 A1 | 8/2014 | Lise et al. |
| 2014/0265009 A1 | 9/2014 | Schaffitzel |
| 2014/0331626 A1 | 11/2014 | Nagy et al. |
| 2014/0346107 A1 | 11/2014 | Anantharamaiah et al. |
| 2015/0114230 A1 | 4/2015 | Winters et al. |
| 2015/0121823 A1 | 5/2015 | Healey |
| 2015/0137415 A1 | 5/2015 | Chapman |
| 2015/0157969 A1 | 6/2015 | Sealey et al. |
| 2015/0375150 A1* | 12/2015 | Sahbaee ............... B01D 46/546 55/482 |
| 2016/0129381 A1 | 5/2016 | Gao et al. |
| 2016/0136553 A1 | 5/2016 | Healey et al. |
| 2016/0166959 A1 | 6/2016 | Cui et al. |
| 2016/0175752 A1 | 6/2016 | Jaganathan et al. |
| 2016/0177891 A1* | 6/2016 | Yadav ................. F02M 35/0201 55/482 |
| 2016/0199765 A1* | 7/2016 | Motomura ............. D04H 1/005 55/467 |
| 2016/0256806 A1* | 9/2016 | Sanders ............... D01D 5/0007 |
| 2016/0308226 A1 | 10/2016 | Behrendt et al. |
| 2016/0361674 A1 | 12/2016 | Swaminathan et al. |
| 2017/0080368 A1* | 3/2017 | Smith .................... B01D 39/18 |
| 2017/0312673 A1 | 11/2017 | Smith et al. |
| 2018/0001244 A1 | 1/2018 | Zhu et al. |
| 2018/0001247 A1 | 1/2018 | Jinka et al. |
| 2018/0015405 A1 | 1/2018 | Healey et al. |
| 2018/0236384 A1 | 8/2018 | Smith |
| 2018/0236385 A1* | 8/2018 | Jinka ................... B01D 39/083 |
| 2018/0236389 A1 | 8/2018 | Jinka et al. |
| 2018/0243674 A1 | 8/2018 | Gulrez et al. |
| 2018/0272258 A1 | 9/2018 | Healey et al. |
| 2020/0215471 A1 | 7/2020 | Sahbaee et al. |
| 2020/0391148 A1 | 12/2020 | Smith et al. |
| 2022/0054961 A1 | 2/2022 | Smith |
| 2022/0105453 A1 | 4/2022 | Jinka et al. |
| 2022/0126226 A1 | 4/2022 | Gulrez et al. |

FOREIGN PATENT DOCUMENTS

| | | | |
|---|---|---|---|
| CN | 105214510 A | 1/2016 | |
| CN | 105771427 A | 7/2016 | |
| EP | 0 246 811 B1 | 11/1992 | |
| EP | 2060311 B1 | 5/2011 | |
| EP | 2 567 744 A1 | 3/2013 | |
| GB | 1408392 A * | 10/1975 | ............... D04H 1/48 |
| GB | 2016943 A | 10/1979 | |
| WO | WO 94/12262 A1 | 6/1994 | |
| WO | WO 99/52619 A1 | 10/1999 | |
| WO | WO 00/04216 A1 | 1/2000 | |

OTHER PUBLICATIONS

U.S. Appl. No. 15/200,612, filed Jul. 1, 2016, Zhu et al.
U.S. Appl. No. 15/217,718, filed Jul. 22, 2016, Jinka et al.
U.S. Appl. No. 15/437,042, filed Feb. 21, 2017, Smith.
U.S. Appl. No. 15/466,809, filed Mar. 22, 2017, Healey et al.
U.S. Appl. No. 16/792,848, filed Feb. 17, 2020, Smith et al.
U.S. Appl. No. 15/790,651, filed Oct. 23, 2017, Jinka et al.
U.S. Appl. No. 15/901,132, filed Feb. 21, 2018, Gulrez et al.
PCT/US2018/018924, Jun. 25, 2018, International Search Report and Written Opinion.
U.S. Appl. No. 17/404,349, filed Aug. 17, 2021, Jinka et al.
U.S. Appl. No. 17/517,708, filed Nov. 3, 2021, Gulrez et al.

* cited by examiner

ELECTRET-CONTAINING FILTER MEDIA

RELATED APPLICATIONS

This application is a continuation of U.S. application Ser. No. 15/438,028, filed Feb. 21, 2017, which is incorporated herein by reference in its entirety.

FIELD OF INVENTION

The present embodiments relate generally to filter media and electret-containing media specifically, to filter media including open support layers.

BACKGROUND

Filter elements can be used to remove contamination in a variety of applications. Such elements can include a filter media which may be formed of a web of fibers. The filter media provides a porous structure that permits fluid (e.g., air) to flow through the media. Contaminant particles (e.g., dust particles, soot particles) contained within the fluid may be trapped on or in the filter media. Depending on the application, the filter media may be designed to have different performance characteristics.

Although many types of filter media for filtering particulates from air exist, improvements in the physical and/or performance characteristics of the filter media (e.g., strength, air resistance, efficiency, and high dust holding capacity) would be beneficial.

SUMMARY OF THE INVENTION

Filter media are generally provided. The subject matter of this application involves, in some cases, interrelated products, alternative solutions to a particular problem, and/or a plurality of different uses of structures and compositions.

In one aspect, filter media are provided.

In some embodiments, the filter media comprises an open support layer and a charged fiber layer mechanically attached to the open support layer, wherein the charged fiber layer comprises a first plurality of fibers comprising a first polymer and a second plurality of fibers comprising a second polymer, wherein the first polymer is acrylic, and wherein the open support layer is a mesh having an air permeability of greater than 1100 CFM and less than or equal to 20000 CFM.

In some embodiments, the filter media comprises an open support layer and a charged fiber layer mechanically attached to the open support layer, wherein the charged fiber layer comprises a plurality of fibers having an average fiber diameter of less than 15 microns and greater than or equal to 1 micron, and wherein the open support layer is a mesh having an air permeability of greater than 1100 CFM and less than or equal to 20000 CFM.

In some embodiments, the filter media comprises an open support layer and a charged fiber layer mechanically attached to the support layer, wherein the open support layer has an air permeability of greater than 1100 CFM and less than or equal to 20000 CFM, wherein the filter media has an overall basis weight of greater than or equal to 12 g/m² and less than or equal to 700 g/m², wherein the filter media has a gamma greater than or equal to 90 and less than or equal to 250, and wherein the filter media has an overall air permeability of greater than or equal to 30 CFM and less than or equal to 1100 CFM.

In some embodiments, the filter media comprises a charged fiber layer, an open support layer mechanically attached to the charged fiber layer, and a coarse support layer that holds the charged fiber layer in a waved configuration and maintains separation of peaks and troughs of adjacent waves of the charged fiber layer, wherein the charged fiber layer has a basis weight of less than or equal to 12 g/m² and greater than or equal to 250 g/m², wherein the open support layer has an air permeability of greater than 1100 CFM and less than or equal to 20000 CFM, and wherein the filter media has an overall air permeability of greater than or equal to 10 CFM and less than or equal to 1000 CFM.

In certain embodiments, the charged fiber layer comprises a first plurality of fibers comprising a first polymer and a second plurality of fibers comprising a second polymer. In certain embodiments, the first polymer and the second polymer have different dielectric constants. In certain embodiments, a difference in dielectric constants between the first polymer and the second polymer is greater than or equal to 0.8 and less than or equal to 8. In certain embodiments, a difference in dielectric constants between the first polymer and the second polymer is greater than or equal to 1.5 and less than or equal to 5.

In certain embodiments, the second polymer comprises a synthetic material selected from the group consisting of polypropylene, dry-spun acrylic, polyvinyl chloride, modacrylic, wet spun acrylic, polytetrafluoroethylene, polypropylene, polystyrene, polysulfone, polyethersulfone, polycarbonate, nylon, polyurethane, phenolic, polyvinylidene fluoride, polyester, polyaramid, polyimide, polyolefin, Kevlar, Nomex, halogenated polymers, polyacrylics, polyphenylene oxide, polyphenylene sulfide, and combinations thereof. In certain embodiments, the second polymer is polypropylene.

In certain embodiments, the second polymer is present in the charged fiber layer in an amount greater than or equal to 10 wt % and less than or equal to 90 wt % versus the total weight of the charged fiber layer. In certain embodiments, the second polymer is present in the charged fiber layer in an amount greater than or equal to 25 wt % and less than or equal to 75 wt % versus the total weight of the charged fiber layer. In certain embodiments, the second polymer is present in the charged fiber layer in an amount greater than or equal to 35 wt % and less than or equal to 65 wt % versus the total weight of the charged fiber layer.

In certain embodiments, the first polymer comprises a synthetic material selected from the group consisting of polypropylene, dry-spun acrylic, polyvinyl chloride, modacrylic, wet spun acrylic, polytetrafluoroethylene, polypropylene, polystyrene, polysulfone, polyethersulfone, polycarbonate, nylon, polyurethane, phenolic, polyvinylidene fluoride, polyester, polyaramid, polyimide, polyolefin, Kevlar, Nomex, halogenated polymers, polyacrylics, polyphenylene oxide, polyphenylene sulfide, and combinations thereof. In certain embodiments, the first polymer is dry-spun acrylic.

In certain embodiments, the first polymer is present in the charged fiber layer in an amount greater than or equal to 10 wt % and less than or equal to 90 wt % versus the total weight of the charged fiber layer. In certain embodiments, the first polymer is present in the charged fiber layer in an amount greater than or equal to 25 wt % and less than or equal to 75 wt % versus the total weight of the charged fiber layer. In certain embodiments, the first polymer is present in the charged fiber layer in an amount greater than or equal to 35 wt % and less than or equal to 65 wt % versus the total weight of the charged fiber layer.

In certain embodiments, the first plurality of fibers have an average fiber diameter of less than 15 microns and greater than or equal to 1 micron. In certain embodiments, the second plurality of fibers have an average fiber diameter of less than 15 microns and greater than or equal to 1 micron.

In certain embodiments, the open support layer has a solidity of less than or equal to 10% and greater than or equal to 0.1%. In certain embodiments, the open support layer has a solidity of less than or equal to 2% and greater than or equal to 0.1%.

In certain embodiments, the charged fiber layer is needled to the support layer. In certain embodiments, the charged fiber layer is needled to the support layer at a punch density of greater than or equal to 15 punches per square centimeter and less than or equal to 60 punches per square centimeter. In certain embodiments, the charged fiber layer is needled to the support layer at a penetration depth of needling of greater than or equal to 8 mm and less than or equal to 20 mm.

In certain embodiments, the charged fiber layer has a basis weight of greater than or equal to 10 g/m$^2$ and less than or equal to 600 g/m$^2$. In certain embodiments, the open support layer has a basis weight of less than or equal to 200 g/m$^2$ and greater than or equal to 2 g/m$^2$. In certain embodiments, the open support layer has a basis weight of less than or equal to 50 g/m$^2$ and greater than or equal to 5 g/m$^2$.

In certain embodiments, the open support layer has a strand count along a first axis of greater than or equal to 2 threads per inch and less than or equal to 27 threads per inch. In certain embodiments, the open support layer has a strand count along a first axis of greater than or equal to 3 strands per inch and less than or equal to 20 strands per inch.

In certain embodiments, the open support layer comprises a plurality of fibers or strands having an average fiber diameter of greater than or equal to 0.5 microns and less than or equal to 2 mm. In certain embodiments, the open support layer comprises a plurality of fibers or strands having an average fiber diameter of greater than or equal to 0.5 microns and less than or equal to 10 microns. In certain embodiments, the open support layer comprises a plurality of fibers or strands having an average fiber diameter of greater than or equal to 10 microns and less than or equal 20 microns. In certain embodiments, the open support layer comprises a plurality of fibers or strands having an average fiber diameter of greater than or equal to 500 microns and less than or equal to 2 mm.

In certain embodiments, the open support layer is formed by a spunbond process and comprises a plurality of fibers having an average fiber diameter of greater than or equal to 10 microns and less than or equal to 20 microns. In certain embodiments, the open support layer is formed by a meltblown process and comprises a plurality of fibers having an average fiber diameter of greater than or equal to 0.5 microns and less than or equal to 10 microns. In certain embodiments, the open support layer is a mesh and comprises a plurality of strands having an average strand diameter of greater than or equal to 500 microns and less than or equal to 2 mm.

In certain embodiments, the charged fiber layer has an uncompressed thickness of greater than or equal to 5 mils and less than or equal to 600 mils, or greater than or equal to 30 mils and less than or equal to 350 mils.

In certain embodiments, the charged fiber layer has an air permeability of greater than or equal to 10 CFM and less than or equal to 1200 CFM. In certain embodiments, the charged fiber layer has an air permeability of greater than or equal to 80 CFM and less than or equal to 1200 CFM. In certain embodiments, the charged fiber layer has an air permeability of greater than or equal to 50 CFM and less than or equal to 650 CFM.

In certain embodiments, the filter media has an overall basis weight of greater than or equal to 12 g/m$^2$ and less than or equal to 700 g/m$^2$. In certain embodiments, the filter media has an overall basis weight of greater than or equal to 25 g/m$^2$ and less than or equal to 650 g/m$^2$.

In certain embodiments, the filter media has an overall basis weight of greater than or equal to 30 g/m$^2$ and less than or equal to 800 g/m$^2$. In certain embodiments, the filter media has an overall basis weight of greater than or equal to 100 g/m$^2$ and less than or equal to 450 g/m$^2$.

In certain embodiments, the filter media has an overall thickness of greater than or equal to 5 mils and less than or equal to 600 mils. In certain embodiments, the filter media has an overall thickness of greater than or equal to 30 mils and less than or equal to 350 mils.

In certain embodiments, the filter media has an overall thickness of greater than or equal to 100 mil and less than or equal to 4000 mil. In certain embodiments, the filter media has an overall thickness of greater than 150 mil and less than or equal to 1000 mil.

In certain embodiments, the filter media has an overall air permeability of greater than or equal to 30 CFM and less than or equal to 1100 CFM. In certain embodiments, the filter media has an overall air permeability of greater than or equal to 100 CFM and less than or equal to 700 CFM. In certain embodiments, the filter media has an overall air permeability of greater than or equal to 10 CFM and less than or equal to 1000 CFM.

In certain embodiments, the filter media has a normalized efficiency of greater than or equal to 1 and less than or equal to 3.5.

In certain embodiments, the filter media has a dust holding capacity of greater than or equal to about 1 g/m$^2$ and less than or equal to about 140 g/m$^2$. In certain embodiments, the filter media has a dust holding capacity of greater than or equal to about 80 g/m$^2$ and less than or equal to about 140 g/m$^2$.

In certain embodiments, the filter media has a dust holding capacity of greater than or equal to 5 g/m$^2$ and less than or equal to 600 g/m$^2$. In certain embodiments, the filter media has a dust holding capacity of greater than or equal to 200 g/m$^2$ and less than or equal to 350 g/m$^2$.

In certain embodiments, the filter media has a gamma of greater than or equal to 30 and less than or equal to 250. In certain embodiments, the filter media has a gamma of greater than or equal to 75 and less than or equal to 150. In certain embodiments, the filter media has a normalized gamma of greater than or equal to 1 and less than or equal to 10.9. In certain embodiments, the filter media has a normalized gamma of greater than or equal to 1 and less than or equal to 5.6.

In certain embodiments, the filter media has a gamma of greater than or equal to 75 and less than or equal to 150. In certain embodiments, the filter media has a gamma of greater than or equal to 20 and less than or equal to 250.

In certain embodiments, the filter media has an initial efficiency of greater than or equal to 50% and less than or equal to 99.999%. In certain embodiments, the filter media has an initial efficiency of greater than or equal to 90% and less than or equal to 99.999%.

In certain embodiments, the charged fiber layer has a periodicity of greater than or equal to 10 and less than or equal to 40 waves per 6 inches. In certain embodiments, the charged fiber layer has a periodicity of greater than or equal to 5 and less than or equal to 9 waves per 6 inches. In certain embodiments, the charged fiber layer has a periodicity of greater than or equal to 3 and less than or equal to 15 waves per 6 inches.

In certain embodiments, the filter media comprises a coarse support layer. In certain embodiments, the coarse support layer comprises a plurality of fibers having an average fiber diameter of greater than or equal to 8 micron and less than or equal to 85 microns. In certain embodiments, the coarse support layer comprises a plurality of fibers having an average fiber diameter of greater than or equal to 12 microns and less than or equal to 60 microns. In certain embodiments, the coarse support layer has a basis weight of less than or equal to 100 $g/m^2$ and greater than or equal to 5 $g/m^2$. In certain embodiments, the coarse support layer has a basis weight of less than or equal to 40 $g/m^2$ and greater than or equal to 12 $g/m^2$.

In certain embodiments, the filter media comprises an outer layer.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
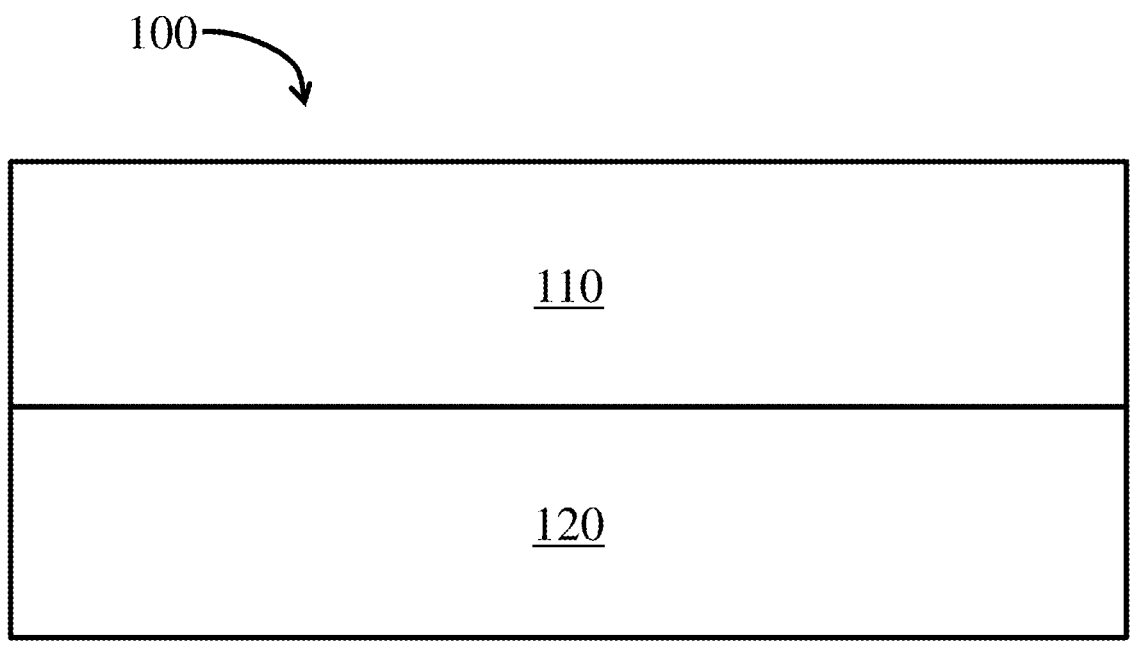
FIG. 1A is a schematic diagram showing a cross-section of a filter media according to one set of embodiments.

Filter media, such as electret-containing filtration media for filtering gas streams (e.g., air), are described herein. In some embodiments, the filter media may be designed to have desirable properties such as stable filtration efficiency over the lifetime of the filter media, increased normalized gamma, relatively low pressure drop (i.e. resistance), and/or relatively low basis weight. In certain embodiments, the filter media may be a composite of two or more types of fiber layers where each layer may be designed to enhance its function without substantially negatively impacting the performance of another layer of the media. For example, one layer of the media may be designed to have a relatively low basis weight and/or a relatively high air permeability, and another layer of the media may be designed to have stable filtration efficiency and/or a relatively high efficiency throughout the filter media's lifetime. The filter media described herein may be particularly well-suited for applications that involve filtering gas streams (e.g., face masks, cabin air filtration, vacuum filtration, room filtration, furnace filtration, respirator equipment, residential or industrial HVAC filtration, high-efficiency particulate arrestance (HEPA) filters, ultra-low particular air (ULPA) filters, medical equipment), though the media may also be used in other applications.

In some embodiments, the filter media described herein may include an open support layer and a second layer that is charged (e.g., a filtration layer). In certain embodiments described herein, the open support layer is mechanically attached (e.g., needled) to the second layer. In some embodiments, the open support layer and/or the second layer may be in a waved configuration. In some such embodiments, the filter media may comprise one or more coarse support layers. In certain embodiments, the second layer is in a waved configuration and the one or more coarse support layers holds the second layer in the waved configuration and maintains separation of peaks and troughs of adjacent waves of the second layer.

In some cases, the open support layer may be positioned upstream of the charged fiber layer (e.g., in a filter element) with respect to the direction of gas/fluid flow. In an alternative set of embodiments, the second layer may be positioned upstream of the first layer (e.g., in a filter element) with respect to the direction of gas/fluid flow. Such a configuration of layers may also stabilize the filtration efficiency of the filter media throughout its lifetime. In some embodiments, the presence of charges in the second layer may improve the efficiency of the media relative to a filter media without charges in the second layer.

Advantageously, the open support layer may have a relatively high air permeability, a relatively low basis weight, and/or a relatively high open area, thereby providing mechanical reinforcement while adding a relatively small amount of basis weight to the overall filter media (e.g., as compared to filter media including other support layers such as coarse support layers).

An example of a filter media including two or more layers is shown in FIG. 1A. As shown illustratively in FIG. 1A, a filter media 100, shown in cross section, may include a first layer 110 (e.g., an open support layer) and a second layer 120 adjacent first layer 110. In some cases, first layer 110 may be directly adjacent (i.e., in direct contact with at least a portion of) second layer 120. In alternative embodiments, second layer 120 may be positioned upstream or downstream of, but not in contact with, first layer 110. In some embodiments, the first layer is an open support layer, for example, having a relatively high air permeability and the second layer is a charged fiber layer (e.g., an electret layer). Other configurations are also possible. For example, in some cases, the filter media includes one or more coarse support layers as described in more detail below.

Figure 1B:
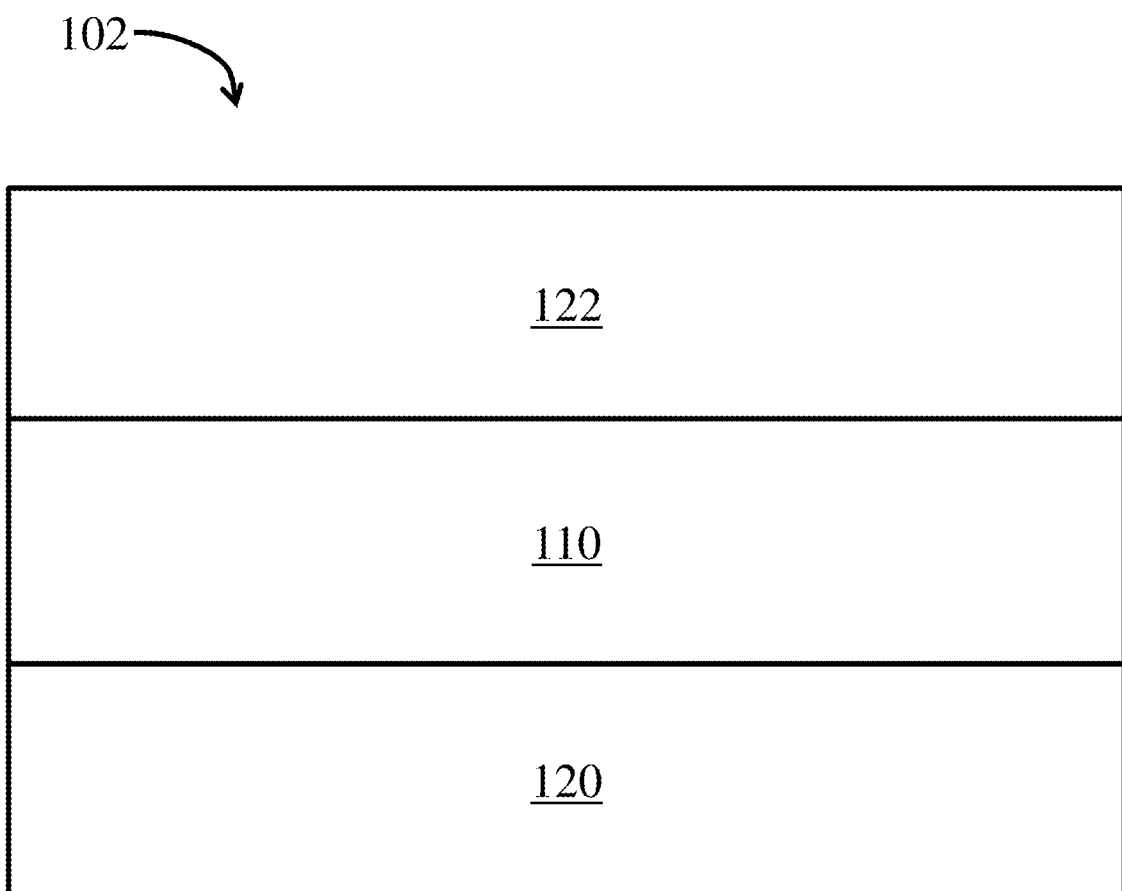
FIG. 1B is a schematic diagram showing a cross-section of a filter media according to one set of embodiments.

In some embodiments, the open support layer may be positioned between two layers. For example, as shown illustratively in FIG. 1B, a filter media 102, shown in cross section, may include a first layer 110 (e.g., the open support layer), a second layer 120 adjacent first layer 110, and a third layer 122 adjacent first layer 110. In some cases, first layer 110 may be directly adjacent (i.e., in direct contact with at least a portion of) second layer 120 and/or third layer 122 (e.g., such that first layer 110 is disposed between the second layer and the third layer). In alternative embodiments, second layer 120 may be positioned upstream of, but not in contact with, first layer 110, and third layer 122 may be position downstream of, but not in contact with, first layer 110. In alternative embodiments, second layer 120 may be positioned downstream of, but not in contact with, first layer 110, and third layer 122 may be position upstream of, but not in contact with, first layer 110. In some embodiments, the first layer is an open support layer, for example, having a relatively high air permeability and the second layer and the third layer may each be a charged fiber layer. In alternative embodiments, the second layer and the third layer may be different. For example, in certain embodiments, the first layer is an open support layer, the second layer is a charged fiber layer, and the third layer is a coarse support layer. Moreover, while the coarse support layer (e.g., the third layer) is illustrated as being adjacent the first layer in FIG. 1B, those skilled in the art would understand, based upon the teachings of this specification, that the coarse support layer may be adjacent the second layer or disposed between the first layer and the second layer.

The terms "first layer" and "second layer" as used herein generally refer to different layers of a filter media and do not necessarily denote a particular order of the layers (e.g., within a filter element). For example, while in some embodiments a first layer (e.g., an open support layer) may be positioned upstream of the second layer with respect to the direction of fluid flow, in other embodiments the first layer may be positioned downstream of the second layer with respect to the direction of fluid flow. As used herein, when a layer is referred to as being "adjacent" another layer, it can be directly adjacent to the layer, or one or more intervening layers also may be present. A layer that is "directly adjacent" another layer means that no intervening layer is present.

As described above, in some embodiments, the filter media may be an electret-containing media. For instance, a layer (e.g., a second layer) of the media may be charged. In general, the net charge of the layer (e.g., the second layer) may be negative or positive. In some instances, at least a surface of the second layer may comprise a negatively charged material and/or a positively charged material. In some embodiments, the polymers in the second layer (e.g., the first polymer and the second polymer) may be selected based on their dielectric constant and/or position on the triboelectric series, as described herein. For example, in some embodiments the second layer is formed via a carding process (e.g., where the fibers are manipulated by rollers and extensions (e.g., hooks, needles)). The polymer fibers within the second layer with a significant difference in dielectric constant and/or that are relatively far apart on the triboelectric series may undergo contact electrification as a result of the carding process to produce a charged non-woven web. Charged non-woven webs may have enhanced performance properties, including an increased efficiency, compared to a similar non-woven web that is uncharged, all other factors being equal.

In other embodiments, a layer may be neutral (e.g., have no net charge).

As described above and herein, in some embodiments, the filter media comprises an open support layer having a relatively high air permeability and/or a relatively low basis weight. Non-limiting examples of suitable open support layers include meshes, scrims, and netting. In a particular set of embodiments, the open support layer is a mesh (e.g., a mesh having an air permeability greater than 1100 CFM). In another particular set of embodiments, the open support layer is a scrim (e.g., a scrim having an air permeability greater than 1100 CFM). In some embodiments, the scrim is formed via a meltblown process or a spunbond process.

The open support layer, as described herein, may have certain desirable characteristics, such as basis weight, solidity, and/or air permeability. For instance, in some instances, the open support layer may have a basis weight of less than or equal to 200 g/m$^2$, less than or equal to 100 g/m$^2$, less than or equal to 90 g/m$^2$, less than or equal to 85 g/m$^2$, less than or equal to 80 g/m$^2$, less than or equal to 70 g/m$^2$, less than or equal to 60 g/m$^2$, less than or equal to 50 g/m$^2$, less than or equal to 40 g/m$^2$, less than or equal to 30 g/m$^2$, less than or equal to 25 g/m$^2$, less than or equal to 10 g/m$^2$, or less than or equal to 3 g/m$^2$. In some embodiments, the open support layer (e.g., a mesh) may have a basis weight of greater than or equal to 2 g/m$^2$, greater than or equal to 3 g/m$^2$, greater than or equal to 10 g/m$^2$, greater than or equal to 25 g/m$^2$, greater than or equal to 30 g/m$^2$, greater than or equal to 40 g/m$^2$, greater than or equal to 50 g/m$^2$, greater than or equal to 60 g/m$^2$, greater than or equal to 70 g/m$^2$, greater than or equal to 80 g/m$^2$, greater than 85 g/m$^2$, greater than or equal to 90 g/m$^2$, greater than or equal to 100 g/m$^2$, or greater than or equal to 200 g/m$^2$. Combinations of the above-referenced ranges are also possible (e.g., a basis weight of less than or equal to 200 g/m$^2$ and greater than or equal to 2 g/m$^2$, a basis weight of less than or equal to 50 g/m$^2$ and greater than or equal to 5 g/m$^2$). Other values of basis weight are also possible. The basis weight may be determined according to test standard ASTM D-846.

In certain embodiments, the open support layer has a relatively high air permeability. For instance, in some embodiments, the open support layer (e.g., a mesh) has an air permeability of greater than 1,100 CFM, greater than or equal to 1,250 CFM, greater than or equal to 1,500 CFM, greater than or equal to 1,750 CFM, greater than or equal to 2,000 CFM, greater than or equal to 2,500 CFM, greater than or equal to 3,000 CFM, greater than or equal to 5,000 CFM, greater than or equal to 7,500 CFM, greater than or equal to 10,000 CFM, greater than or equal to 12,500 CFM, greater than or equal to 15,000 CFM, or greater than or equal to 17,500 CFM. In some embodiments, the open support layer has an air permeability of less than or equal to 20,000 CFM, less than or equal to 17,500 CFM, less than or equal to 15,000 CFM, less than or equal to 12,500 CFM, less than or equal to 10,000 CFM, less than or equal to 7,500 CFM, less than or equal to 5,000 CFM, less than or equal to 3,000 CFM, less than or equal to 2,500 CFM, less than or equal to 2,000 CFM, less than or equal to 1,750 CFM, less than or equal to 1,500 CFM, or less than or equal to 1,250 CFM. Combinations of the above-referenced ranges are also possible (e.g., an air permeability of greater than 1,100 CFM and less than or equal to 20,000 CFM). Other values of air permeability are also possible. Air permeability of the open support layer, as determined herein, is measured according to the test standard ASTM D737 over 38 cm$^2$ surface area of the media and using a pressure of 125 Pa.

In certain embodiments, the open support layer may have a solidity of less than or equal to 10%, less than or equal to 8%, less than or equal to 6%, less than or equal to 5%, less than or equal to 4%, less than or equal to 3%, less than or equal to 2%, less than or equal to 1%, or less than or equal to 0.5%. In some embodiments, the open support layer may have a solidity of greater than or equal to 0.1%, greater than or equal to 0.5%, greater than or equal to 1%, greater than or equal to 2%, greater than or equal to 3%, greater than or equal to 4%, greater than or equal to 5%, greater than or equal to 6%, or greater than or equal to 8%. Combinations of the above-referenced ranges are also possible (e.g., a solidity of less than or equal to 10% and greater than or equal to 0.1%, less than or equal to 2% and greater than or equal to 0.1%). Other ranges are also possible. Solidity generally refers to the percentage of volume of solids with respect to the total volume of the layer.

The open support layer (e.g., a mesh, a netting) may have, in some cases, a particular strand count. In some embodiments, the strand count may be greater than or equal to 2 strands per inch, greater than or equal to 3 strands per inch, greater than or equal to 5 strands per inch, greater than or equal to 7 strands per inch, greater than or equal to 10 strands per inch, greater than or equal to 12 strands per inch, greater than or equal to 15 strands per inch, greater than or equal to 17 strands per inch, greater than or equal to 20 strands per inch, greater than or equal to 22 strands per inch, or greater than or equal to 25 strands per inch. In certain embodiments, the strand count may be less than or equal to 27 strands per inch, less than or equal to 25 strands per inch, less than or equal to 22 strands per inch, less than or equal to 20 strands per inch, less than or equal to 17 strands per inch, less than or equal to 15 strands per inch, less than or equal to 12 strands per inch, less than or equal to 10 strands per inch, less than or equal to 7 strands per inch, less than or equal to 5 strands per inch, or less than or equal to 3 strands per inch. Combinations of the above-referenced ranges are also possible (e.g., a strand count of greater than or equal to 2 strands per inch and less than or equal to 27 strands per inch, greater than or equal to 3 strands per inch and less than or equal to 20 strands per inch). Other ranges of strand count are also possible. Strand count, as used herein, is measured along a first axis of the open support layer. In some embodiments, the open support layer (e.g., a mesh) may have a first strand count in a first axis of the open support layer, and a second strand count, different than the first strand count, in a second axis of the open support layer orthogonal to the first axis. The second strand count measured along a second axis of the open support layer may range as noted above in the context of the strand count measured along a first axis of the open support layer (e.g., a second strand count of greater than or equal to 2 strands per inch and less than or equal to 27 strands per inch, greater than or equal to 3 strands per inch and less than or equal to 20 strands per inch). The term axis, as used herein, generally refers to a reference direction of the layer parallel to one or more strands in the layer. For example, strand count may be determined by counting the number of strands per inch laying substantially perpendicular to the particular axis (e.g., the number of strands/fibers intersecting the strand parallel to the axis). In some embodiments, the open support layer comprises a plurality of fibers or strands. The fibers or strands of the open support layer may be continuous or non-continuous. Continuous fibers (e.g., strands) and are made by a "continuous" fiber-forming process, such as a meltblown process, a meltspun, an extrusion process, woven yarns, laid scrims, and/or a spunbond process, and typically have longer lengths than non-continuous fibers as described in more detail below. Non-continuous fibers are, for example, staple fibers that are generally cut (e.g., from a filament) or formed as non-continuous discrete fibers to have a particular length or a range of lengths as described in more detail below.

In certain embodiments, the plurality of fibers or strands of the open support layer include synthetic fibers or strands (e.g., synthetic polymer fibers or strands). The synthetic fibers or strands of the open support layer may be continuous fibers. Non-limiting examples of suitable synthetic fibers/strands include polyester, polyaramid, polyimide, polyolefin (e.g., polyethylene such as high density polyethylene, low density polyethylene, and/or linear low density polyethylene), ethylene-vinyl acetate, polyacrylamide, polylactic acid, polypropylene, Kevlar, Nomex, halogenated polymers (e.g., polyethylene terephthalate), acrylics, polyphenylene oxide, polyphenylene sulfide, thermoplastic elastomers (e.g., thermoplastic polyurethane), and combinations thereof.

Other processes and materials used to form the open support layer are also possible. For example, in some embodiments, the open support layer is a fibrous layer, an extruded layer, an oriented layer, a woven layer, or a non-woven layer.

In certain embodiments, an adhesive is co-extruded with one or more fibers/strands of the open support layer (e.g., for joining the open support layer to a second layer).

In some embodiments, the plurality of fibers (or strands) in the open support layer may have an average fiber (or strand) diameter of greater than or equal to 0.5 microns, greater than or equal to 1 micron, greater than or equal to 2 microns, greater than or equal to 3 microns, greater than or equal to 4 microns, greater than or equal to 5 microns, greater than or equal to 6 microns, greater than or equal to 8 microns, greater than or equal to 10 microns, greater than or equal to 15 microns, greater than or equal to 20 microns, greater than or equal to 50 microns, greater than or equal to 75 microns, greater than or equal to 100 microns, greater than or equal to 250 microns, greater than or equal to 500 microns, greater than or equal to 750 microns, greater than or equal to 1 mm, greater than or equal to 1.25 mm, greater than or equal to 1.5 mm, or greater than or equal to 1.75 mm. In some embodiments, the plurality of fibers in the open support layer may have an average fiber (or strand) diameter of less than or equal to 2 mm, less than or equal to 1.75 mm, less than or equal to 1.5 mm, less than or equal to 1.25 mm, less than or equal to 1 mm, less than or equal to 750 microns, less than or equal to 500 microns, less than or equal to 250 microns, less than or equal to 100 microns, less than or equal to 75 microns, less than or equal to 50 microns, less than or equal to 20 microns, less than or equal to 15 microns, less than or equal to 10 microns, less than or equal to 8 microns, less than or equal to 7 microns, less than or equal to 6 microns, less than or equal to 5 microns, less than or equal to 4 microns, less than or equal to 3 microns, less than or equal to 2 microns, or less than or equal to 1 micron. Combinations of the above-referenced ranges are also possible (e.g., greater than or equal to 0.5 microns and less than or equal to 2 mm, greater than or equal to 0.5 microns and less than or equal to 10 microns, greater than or equal to 10 microns and less than or equal 20 microns, greater than or equal to 500 microns and less than or equal to 2 mm). Other values of average fiber (or strand) diameter for the open support layer are also possible. Individual fiber/strand diameters within the open support layer may be measured by microscopy, for example scanning electron microscopy (SEM), and statistics regarding fiber/strand diameter such as average fiber/strand diameter, median fiber/strand diameter, and fiber/strand diameter standard deviation may be determined by performing appropriate statistical techniques on the measured fiber/strand diameters.

In an exemplary embodiment, the open support layer is formed by a spunbond process and comprises a plurality of fibers having an average fiber diameter of greater than or equal to 10 microns and less than or equal to 20 microns, In another exemplary embodiment, the open support layer is formed by a meltblown process and comprises a plurality of fibers having an average fiber diameter of greater than or equal to 0.5 microns and less than or equal to 10 microns. In yet another exemplary embodiment, the open support layer is a mesh and comprises a plurality of strands having an average strand diameter of greater than or equal to 500 microns and less than or equal to 2 mm.

In some embodiments, the open support layer comprises a plurality of fibers (e.g., synthetic fibers, continuous fibers) (or strands) having a continuous length. In certain embodiments, the plurality of fibers (or strands) in the open support layer may have an average length of greater than about 5 inches, greater than or equal to 10 inches, greater than or equal to 25 inches, greater than or equal to 50 inches, greater than or equal to 100 inches, greater than or equal to 300 inches, greater than or equal to 500 inches, greater than or equal to 700 inches, or greater than or equal to 900 inches. In some instances, the fibers (or strands) may have an average length of less than or equal to 1000 inches, less than or equal to 800 inches, less than or equal to 600 inches, less than or equal to 400 inches, or less than or equal to 100 inches. Combinations of the above-referenced ranges are also possible (e.g., greater than or equal to 50 inches and less than or equal to 1000 inches). Other ranges are also possible.

In other embodiments, the open support layer comprises a plurality of fibers (e.g., synthetic fibers, staple fibers) (or strands) having an average length of less than about 5 inches (127 mm). For example, the plurality of fibers (or strands) in the open support layer may have an average length of, for example, less than or equal to 100 mm, less than or equal to 80 mm, less than or equal to 60 mm, less than or equal to 40 mm, less than or equal to 20 mm, less than or equal to 10 mm, less than or equal to 5 mm, less than or equal to 1 mm, less than or equal to 0.5 mm, or less than or equal to 0.1 mm. In some instances, plurality of fibers (or strands) in the open support layer may have an average length of greater than or equal to 0.02 mm, greater than or equal to 0.1 mm, greater than or equal to 0.5 mm, greater than or equal to 1 mm, greater than or equal to 5 mm, greater than or equal to 10 mm, greater than or equal to 20 mm, greater than or equal to 40 mm, greater than or equal to 60 mm. Combinations of the above-referenced ranges are possible (e.g., greater than or equal to 0.02 mm and less than or equal to 80 mm, greater than or equal to 0.03 mm and less than or equal to 40 mm). Other ranges are also possible.

In some embodiments, the open support layer has a dry tensile strength of greater than or equal 4 lbs/in, greater than or equal to 5 lbs/in, greater than or equal to 7 lbs/in, greater than or equal to 10 lbs/in, greater than or equal to 15 lbs/in, greater than or equal to 20 lbs/in, greater than or equal to 25 lbs/in, greater than or equal to 30 lbs/in, greater than or equal to 35 lbs/in, greater than or equal to 40 lbs/in, greater than or equal to 45 lbs/in, greater than or equal to 50 lbs/in, or greater than or equal to 55 lbs/in. In certain embodiments, the open support layer has a dry tensile strength of less than or equal to 60 lbs/in, less than or equal to 55 lbs/in, less than or equal to 50 lbs/in, less than or equal to 45 lbs/in, less than or equal to 40 lbs/in, less than or equal to 35 lbs/in, less than or equal to 30 lbs/in, less than or equal to 25 lbs/in, less than or equal to 20 lbs/in, less than or equal to 15 lbs/in, less than or equal to 10 lbs/in, less than or equal to 7 lbs/in, or less than or equal to 5 lbs/in. Combinations of the above-referenced ranges are also possible (e.g., a dry tensile strength of greater than or equal to 4 lbs/in and less than or equal to 60 lbs/in, greater than or equal to 10 lbs/in and less than or equal to 30 lbs/in). Other ranges are also possible. As determined herein, the dry tensile strength is measured according to the standard EN/ISO 1924-4 using a jaw separation speed of 10 mm/min and a sample size of 3 inches by 6 inches.

In some cases, the open support layer may have a particular thickness. For example, in some embodiments, the thickness is greater than or equal to 10 microns, greater than or equal to 15 microns, greater than or equal to 20 microns, greater than or equal to 50 microns, greater than or equal to 75 microns, greater than or equal to 100 microns, greater than or equal to 250 microns, greater than or equal to 500 microns, greater than or equal to 750 microns, greater than or equal to 1 mm, greater than or equal to 1.25 mm, greater than or equal to 1.5 mm, or greater than or equal to 1.75 mm. In some embodiments, the thickness of the the open support layer may be less than or equal to 2 mm, less than or equal to 1.75 mm, less than or equal to 1.5 mm, less than or equal to 1.25 mm, less than or equal to 1 mm, less than or equal to 750 microns, less than or equal to 500 microns, less than or equal to 250 microns, less than or equal to 100 microns, less than or equal to 75 microns, less than or equal to 50 microns, less than or equal to 20 microns, or less than or equal to 15 microns. Combinations of the above referenced ranges are also possible (e.g., a thickness of greater than or equal to 10 mircons and less than or equal to 2 mm, greater than or equal to 250 microns and less than or equal to 2 mm). Other ranges are also possible. Thickness, as determined herein, may be measured according to ASTM standard D-1777 at 0.3 psi.

In certain embodiments, the open support layer may have a dry tensile elongation at break of greater than or equal to 5%. For example, in some embodiments, the open support layer may have a dry tensile elongation at break of greater than or equal to 5%, greater than or equal to 10%, greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 100%, greater than or equal to 110%, greater than or equal to 120%, greater than equal to 130%, or greater than or equal to 140%. In certain embodiments, the open support layer may have a dry tensile elongation at break of less than or equal to 150%, less than or equal to 140%, less than or equal to 130%, less than or equal to 120%, less than or equal to 110%, less than or equal to 100%, less than or equal to 90%, less than or 80%, less than or equal to 70%, less than or equal to 60%, less than or equal to 50%, less than or equal to 40%, less than or equal to 30%, less than or equal to 20%, or less than or equal to 10%. Combinations of the above reference ranges are also possible (e.g., greater than or equal to 5% and less than or equal to 150%, greater than or equal to 10% and less than or equal to 60%). Other ranges are also possible. As determined herein, the dry tensile elongation at break is measured according to the standard EN/ISO 1924-4 using a jaw separation speed of 10 mm/min.

The first layer (e.g., an open support layer such as a mesh) and the second layer (e.g., a charged fiber layer) may be joined to one another (e.g., by mechanical attachment, lamination, point bonding, thermo-dot bonding, ultrasonic bonding, calendering, use of adhesives (e.g., glue-web), and/or co-pleating). In some embodiments, the first layer (e.g., the open support layer) and the second layer may be mechanically attached. Non-limiting examples of suitable means for mechanical attachment include needling, stitching, and hydroentangling. In a particular set of embodiments, the first layer is needled to the second layer. In certain embodiments, the first layer and the second layer may be mechanically attached to one another such that the filter media comprising the first layer and the second layer is substantially free of adhesives. For example, in some embodiments, an open support layer is mechanically attached to the second layer (e.g., a charged fiber layer) and are joined to one another without an adhesive. In alternative embodiments, the open support layer and the second layer may be joined to one another by mechanical attachment and an adhesive.

In embodiments in which a first layer (e.g., an open support layer such as a mesh) is needled to a second layer (e.g., a charged fiber layer), the needling may have a particular punch density. In some embodiments, the punch density of needling is greater than or equal to 15 punches per square centimeter, greater than or equal to 20 punches per square centimeter, greater than or equal to 25 punches per square centimeter, greater than or equal to 30 punches per square centimeter, greater than or equal to 35 punches per square centimeter, greater than or equal to 40 punches per square centimeter, greater than or equal to 45 punches per square centimeter, greater than or equal to 50 punches per square centimeter, or greater than or equal to 55 punches per square centimeter. In certain embodiments, the needling punch density is less than or equal to 60 punches per square centimeter, less than or equal to 55 punches per square centimeter, less than or equal to 50 punches per square centimeter, less than or equal to 45 punches per square centimeter, less than or equal to 40 punches per square centimeter, less than or equal to 35 punches per square centimeter, less than or equal to 30 punches per square centimeter, less than or equal to 25 punches per square centimeter, or less than or equal to 20 punches per square centimeter. Combinations of the above referenced ranges are also possible (e.g., greater than or equal to 15 punches per square centimeter and less than or equal to 60 punches per square centimeter, greater than or equal to 25 punches per square centimeter and less than or equal to 45 punches per square centimeter). Other ranges are also possible.

The open support layer may be needled to the charged fiber layer using a particular penetration depth of needling across at least the two layers. In certain embodiments, the penetration depth of needling across two or more layers of the filter media (e.g., an open support layer and a charged fiber layer) is greater than or equal to 8 mm, greater than or equal to 10 mm, greater than or equal to 12 mm, greater than or equal to 14 mm, greater than or equal to 16 mm, or greater than or equal to 18 mm. In certain embodiments, the penetration depth of needling across two or more layers of the filter media is less than or equal to 20 mm, less than or equal to 18 mm, less than or equal to 16 mm, less than or equal to 14 mm, less than or equal to 12 mm, or less than or equal to 10 mm. Combinations of the above referenced ranges are also possible (e.g., a penetration depth of needling of greater than or equal to 8 mm and less than or equal to 20 mm, greater than or equal to 12 mm and less than or equal to 16 mm). Other ranges are also possible.

As described above and herein, in some embodiments, the second layer is a charged fiber layer. In certain embodiments, the charged fiber layer comprises a plurality of fibers. The fibers of the second layer may be non-continuous (e.g., staple fibers).

The charged fiber layer, as described herein, may have certain structural characteristics, such as basis weight and/or fiber diameter. For instance, in some embodiments, the charged fiber layer may have a basis weight of greater than or equal to 12 $g/m^2$, greater than or equal to 15 $g/m^2$, greater than or equal to 20 $g/m^2$, greater than or equal to 25 $g/m^2$, greater than or equal to 30 $g/m^2$, greater than or equal to 40 $g/m^2$, greater than or equal to 50 $g/m^2$, greater than or equal to 60 $g/m^2$, greater than or equal to 70 $g/m^2$, greater than or equal to 80 $g/m^2$, greater than or equal to 100 $g/m^2$, greater than or equal to 200 $g/m^2$, greater than or equal to 300 $g/m^2$, greater than or equal to 400 $g/m^2$, greater than or equal to 500 $g/m^2$, or greater than or equal to 600 $g/m^2$. In some instances, the charged fiber layer may have a basis weight of less than or equal to 700 $g/m^2$, less than or equal to 600 $g/m^2$, less than or equal to 500 $g/m^2$, less than or equal to 400 $g/m^2$, less than or equal to 300 $g/m^2$, less than or equal to 200 $g/m^2$, less than or equal to 100 $g/m^2$, less than or equal to 90 $g/m^2$, less than or equal to 80 $g/m^2$, less than or equal to 70 $g/m^2$, less than or equal to 60 $g/m^2$, less than or equal to 50 $g/m^2$, less than or equal to 40 $g/m^2$, less than or equal to 30 $g/m^2$, less than or equal to 25 $g/m^2$, less than or equal to 20 $g/m^2$, or less than or equal to 15 $g/m^2$. Combinations of the above-referenced ranges are also possible (e.g., a basis weight of greater than or equal to 12 $g/m^2$ and less than or equal to 700 $g/m^2$, a basis weight of greater than or equal to 12 $g/m^2$ and less than or equal to 250 $g/m^2$, a basis weight of greater than or equal to 15 $g/m^2$ and less than or equal to 100 $g/m^2$). Other values of basis weight are also possible. The basis weight may be determined as described above.

In some embodiments, the charged fiber layer may comprise a plurality of fibers having a particular average fiber diameter. In some embodiments, the plurality of fibers of the second layer have an average fiber diameter of greater than or equal to 1 micron, greater than or equal to 2 microns, greater than or equal to 3 microns, greater than or equal to 5 microns, greater than or equal to 7 microns, greater than or equal to 9 microns, greater than or equal to 10 microns, greater than or equal to 12 microns, greater than or equal to 14 microns, greater than or equal to 15 microns, greater than or equal to 16 microns, greater than or equal to 18 microns, greater than or equal to 19 microns, greater than or equal to 20 microns, or greater than or equal to 21 microns. In certain embodiments, the plurality of fibers of the second layer have an average fiber diameter of less than or equal to 22 microns, less than or equal to 21 microns, less than or equal to 20 microns, less than or equal to 19 microns, less than or equal to 18 microns, less than or equal to 16 microns, less than or equal to 15 microns, less than or equal to 14 microns, less than or equal to 12 microns, less than or equal to 10 microns, less than or equal to 9 microns, less than or equal to 7 microns, less than or equal to 5 microns, less than or equal to 4 microns, less than or equal to 3 microns, or less than or equal to 2 microns. Combinations of the above-referenced ranges are also possible (e.g., an average fiber diameter of greater than or equal to 1 micron and less than or equal to 22 microns, greater than or equal to 1 micron and less than or equal to 15 microns, greater than or equal to 15 microns and less than or equal to 22 microns). Other ranges also possible.

In some embodiments, the charged fiber layer may comprise a plurality of fibers that are relatively fine (e.g., having an average fiber diameter less than 15 microns). For example, in certain embodiments, the second layer comprises a plurality of fibers having an average fiber diameter less than 15 microns, less than or equal to 14 microns, less than or equal to 12 microns, less than or equal to 10 microns, less than or equal to 9 microns, less than or equal to 7 microns, less than or equal to 5 microns, less than or equal to 4 microns, less than or equal to 3 microns, or less than or equal to 2 microns. In some embodiments, the second layer comprises a plurality of fibers having an average fiber diameter of greater than or equal to 1 micron, greater than or equal to 2 microns, greater than or equal to 3 microns, greater than or equal to 5 microns, greater than or equal to 7 microns, greater than or equal to 9 microns, greater than or equal to 10 microns, greater than or equal to 12 microns, or greater than or equal to 14 microns. Combinations of the above-referenced ranges are also possible (e.g., less than 15 microns and greater than or equal to 1 micron, less than 15 microns and greater than or equal to 3 microns, less than or equal to 12 microns and greater than or equal to 3 microns). Other ranges are also possible. In an exemplary embodiment, the filter media comprises an open support layer (i.e. a first layer) and a charged fiber layer (i.e. a second layer) adjacent the open support layer, the charged fiber layer comprising a plurality of fibers having an average fiber diameter less than 15 microns.

In some embodiments, as described herein, the charged fiber layer may comprise a one or more plurality of fibers. For example, in certain embodiments, the charged fiber layer comprises a first plurality of fibers (e.g., comprising a first polymer) and a second plurality of fibers (e.g., comprising a second polymer, different than the first polymer). In some such embodiments, each of the plurality of fibers (e.g., the first plurality of fibers, the second plurality of fibers) may have an average fiber diameter as described above. For example, in an exemplary embodiment, the charged fiber layer comprises a first plurality of fibers and a second plurality of fibers, the first plurality of fibers and/or the second plurality of fibers having an average fiber diameter of less than 15 microns and greater than or equal to 1 micron. In another exemplary embodiment, the charged fiber layer comprises a first plurality of fibers and a second plurality of fibers, the first plurality of fibers and/or the second plurality of fibers having an average fiber diameter of greater than or equal to 1 micron and less than or equal to 22 microns.

In certain embodiments, the plurality of fibers of the charged fiber layer include synthetic fibers (synthetic polymer fibers). The synthetic fibers of the second layer may be staple fibers. Non-limiting examples of suitable synthetic fibers include polypropylene, dry-spun acrylic (e.g., produced from a dry-spinning process), polyvinyl chloride, mod-acrylic, wet spun acrylic, polytetrafluoroethylene, polypropylene, polystyrene, polysulfone, polyethersulfone, polycarbonate, nylon (e.g., nylon 6/6), polyurethane, phenolic, polyvinylidene fluoride, polyester, polyaramid, polyimide, polyolefin (e.g., polyethylene), Kevlar, Nomex, halogenated polymers (e.g., polyethylene terephthalate), polyacrylics, polyphenylene oxide, polyphenylene sulfide, and combinations thereof. In some embodiments, the synthetic fibers are halogen-free such that significant dioxins are not detectable when incinerated. For example, the fibers may be halogen-free acrylic fibers formed by dry spinning. In some embodiments, the second layer and/or the entire filter media is halogen-free such that significant dioxins are not detectable when incinerated.

In some embodiments, the charged fiber layer comprises a mixture of two or more polymeric fibers. For instance, the charged fiber layer may comprise at least a first plurality of fibers comprising a first polymer and a second plurality of fibers comprising a second polymer. For example, in an exemplary embodiment, the charged fiber layer comprises a first plurality of fibers comprising a first polymer where the first polymer is acrylic (e.g., dry-spun acrylic). In certain embodiments, the charged fiber layer comprises a second plurality of fibers comprising a second type of polymer fiber, different than the first type of polymer fiber. In certain embodiments, the second type of polymer fiber is polypropylene.

In certain embodiments, the first polymer and the second polymer are selected such that the first polymer and the second polymer have different dielectric constants. The two polymers having different dielectric constants may facilitate charging of the layer (e.g., triboelectric charging). Without wishing to be bound by theory, two polymers with different dielectric constants in the layer may come into frictional contact during manufacture of the layer such that one polymer will lose electrons and give them away to the other polymer and, as a result, the polymer losing electrons is net positively charged, the other polymer receiving electrons is net negatively charged. In embodiments in which the second layer of the filter media is a charged fiber layer, the charged layer may have one or more characteristics described in commonly-owned U.S. Pat. No. 6,623,548, entitled "Filter materials and methods for the production thereof", issued Sep. 23, 2003, which is incorporated herein by reference in its entirety for all purposes. For example, in some embodiments, the second layer is an electrostatically charged layer formed by blending together polypropylene fibers with halogen free acrylic fibers, polypropylene with polyvinyl chloride (PVC) fibers, or a mixture of halogen free acrylic fibers and PVC fibers and, optionally, carding the blended fibers so as to form a non-woven fabric.

In some embodiments, the difference in dielectric constants between the first polymer and the second polymer may be selected to be greater than or equal to 0.8, greater than or equal to 1, greater than or equal to 1.2, greater than or equal to 1.5, greater than or equal to 2, greater than or equal to 3, greater than or equal to 5, or greater than or equal to 7. In certain embodiments, the difference in dielectric constants between the first polymer and the second polymer may be selected to be less than or equal to 8, less than or equal to 7, less than or equal to 5, less than or equal to 3, less than or equal to 2, less than or equal to 1.5, less than or equal to 1.2, or less than or equal to 1. Combinations of the above-referenced ranges are also possible (e.g., the difference in dielectric constants between the first polymer and the second polymer is greater than or equal to 0.8 and less than or equal to 8, greater than or equal to 1.5 and less than or equal to 5). Other ranges are also possible.

Table 1 shows representative dielectric constants for several exemplary polymers.

TABLE 1

| Materials | Dielectric constant |
| --- | --- |
| Polytetrafluoroethylene | 2.10 |
| Polypropylene | 2.2-2.36 |

TABLE 1-continued

| Materials | Dielectric constant |
| --- | --- |
| Polyethylene | 2.25-2.35 |
| Polystyrene | 2.45-2.65 |
| Polyvinyl chloride | 2.8-3.1 |
| Polysulfone | 3.07 |
| Polyethersulfone | 3.10 |
| Polyethylene terephthalate | 3.1 |
| Polycarbonate | 3.17 |
| Acrylic | 3.5-4.5 |
| Nylon 6/6 | 4.0-4.6 |
| Polyurethane | 6.3 |
| Phenolic | 6.5 |
| Polyvinylidene fluoride | 8.4 |

The first polymer and the second polymer may be present in the second layer in any suitable amount. For example, in some embodiments, the first polymer is present in the second layer in an amount of greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, greater than or equal to 50 wt %, greater than or equal to 60 wt %, greater than or equal to 65 wt %, greater than or equal to 70 wt %, greater than or equal to 75 wt %, greater than or equal to 80 wt %, or greater than or equal to 85 wt % with respect to the total amount of fibers in the layer and/or the total weight of the layer. In certain embodiments, the first polymer is present in the second layer in an amount of less than or equal to 90 wt %, less than or equal to 85 wt %, less than or equal to 80 wt %, less than or equal to 75 wt %, less than or equal to 70 wt %, less than or equal to 65 wt %, less than or equal to 60 wt %, less than or equal to 50 wt %, less than or equal to 40 wt %, less than or equal to 35 wt %, less than or equal to 30 wt %, less than or equal to 25 wt %, less than or equal to 20 wt %, or less than or equal to 15 wt % with respect to the total amount of fibers in the layer and/or the total weight of the layer. Combinations of the above referenced ranges are also possible (e.g., greater than or equal to 10 wt % and less than or equal to 90 wt %, greater than or equal to 25 wt % and less than or equal to 75 wt %, greater than or equal to 35 wt % and less than or equal to 65 wt %). Other ranges are also possible.

In some embodiments, the second polymer is present in the second layer in an amount of less than or equal to 90 wt %, less than or equal to 85 wt %, less than or equal to 80 wt %, less than or equal to 75 wt %, less than or equal to 70 wt %, less than or equal to 65 wt %, less than or equal to 60 wt %, less than or equal to 50 wt %, less than or equal to 40 wt %, less than or equal to 35 wt %, less than or equal to 30 wt %, less than or equal to 25 wt %, less than or equal to 20 wt %, or less than or equal to 15 wt % with respect to the total amount of fibers in the layer and/or the total weight of the layer. In certain embodiments, the second polymer is present in the second layer in an amount of greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, greater than or equal to 50 wt %, greater than or equal to 60 wt %, greater than or equal to 65 wt %, greater than or equal to 70 wt %, greater than or equal to 75 wt %, greater than or equal to 80 wt %, or greater than or equal to 85 wt % with respect to the total amount of fibers in the layer and/or the total weight of the layer. Combinations of the above referenced ranges are also possible (e.g., greater than or equal to 10 wt % and less than or equal to 90 wt %, greater than or equal to 25 wt % and less than or equal to 75 wt %, greater than or equal to 35 wt % and less than or equal to 65 wt %). Other ranges are also possible.

In some embodiments, the second layer comprises the first polymer in an amount of greater than or equal to 10 wt % and less than or equal to 90 wt % and the second polymer in an amount of less than or equal to 90 wt % and greater than or equal to 10 wt % with respect to the total amount of fibers in the layer. For example, in some embodiments, the second layer comprises the first polymer in an amount of greater than or equal to 25 wt % and less than or equal to 75 wt % and the second polymer in an amount of less than or equal to 75 wt % and greater than or equal to 25 wt % with respect to the total amount of fibers in the layer. In certain embodiments, the second layer may comprise the first polymer in an amount of greater than or equal to 35 wt % and less than or equal to 65 wt %, and the second polymer in an amount of less than or equal to 65 wt % and greater than or equal to 35 wt %, with respect to the total amount of fibers in the layer. In certain embodiments, the second layer comprises each of the first polymer and the second polymer in an amount of about 50 wt % with respect to the total amount of fibers in the layer.

In some embodiments, the charged fiber layer comprises a plurality of fibers (e.g., synthetic fibers, staple fibers) having an average length of less than 5 inches (127 mm). For example, the plurality of fibers in the charged fiber layer may have an average length of, for example, less than or equal to 100 mm, less than or equal to 80 mm, less than or equal to 60 mm, less than or equal to 40 mm, less than or equal to 20 mm, less than or equal to 10 mm, less than or equal to 5 mm, less than or equal to 1 mm, less than or equal to 0.5 mm, or less than or equal to 0.1 mm. In some instances, plurality of fibers in the charged fiber layer may have an average length of greater than or equal to 0.02 mm, greater than or equal to 0.1 mm, greater than or equal to 0.5 mm, greater than or equal to 1 mm, greater than or equal to 5 mm, greater than or equal to 10 mm, greater than or equal to 20 mm, greater than or equal to 40 mm, greater than or equal to 60 mm. Combinations of the above-referenced ranges are possible (e.g., greater than or equal to 1 mm and less than or equal to 80 mm, greater than or equal to 1 mm and less than or equal to 60 mm). Other ranges are also possible.

In some embodiments, the charged fiber layer may be designed to have a particular uncompressed thickness. In some embodiments, the uncompressed thickness of the charged fiber layer may be greater than or equal to greater than or equal to 5 mils, greater than or equal to 10 mils, greater than or equal to 25 mils, greater than or equal to 30 mils, greater than or equal to 50 mils, greater than or equal to 100 mils, greater than or equal to 200 mils, greater than or equal to 250 mils, greater than or equal to 300 mils, greater than or equal to 350 mils, greater than or equal to 400 mils, greater than or equal to 450 mils, or greater than or equal to 500 mils. In certain embodiments, the uncompressed thickness of the charged fiber layer may be less than or equal to 600 mils, less than or equal to 500 mils, less than or equal to 450 mils, less than or equal to 400 mils, less than or equal to 350 mils, less than or equal to 300 mils, less than or equal to 250 mils, less than or equal to 200 mils, less than or equal to 100 mils, less than or equal to 50 mils, less than or equal to 25 mils, or less than or equal to 10 mils. Combinations of the above referenced ranges are also possible (e.g., greater than or equal to 5 mils and less than or equal to 600 mils, greater than or equal to 30 mils and less than or equal to 350 mils). Other ranges are also possible. Uncompressed thickness, as used herein, is determined using a Mitutoyo thickness gauge. Briefly, the fiber layer is compressed using a circular probe having a diameter of 1 mm under at least three different weights (e.g., 10 grams, 5 grams, 2 grams). The ordinary least squares linear regression is determined for each weight and corresponding thickness, and is used to calculated the thickness of the fiber layer corresponding to 0 grams of applied weight (i.e. the uncompressed thickness for that layer).

In certain embodiments, the charged fiber layer may have a particular air permeability. In some embodiments, the air permeability of the charged fiber layer is greater than or equal to 10 CFM, greater than or equal to 25 CFM, greater than or equal to 50 CFM, greater than or equal to 80 CFM, greater than or equal to 100 CFM, greater than or equal to 200 CFM, greater than or equal to 250 CFM, greater than or equal to 300 CFM, greater than or equal to 350 CFM, greater than or equal to 400 CFM, greater than or equal to 450 CFM, greater than or equal to 500 CFM, greater than or equal to 550 CFM, greater than or equal to 600 CFM, greater than or equal to 650 CFM, greater than or equal to 700 CFM, greater than or equal to 750 CFM, greater than or equal to 800 CFM, greater than or equal to 850 CFM, greater than or equal to 900 CFM, greater than or equal to 950 CFM, greater than or equal to 1000 CFM, greater than or equal to 1050 CFM, greater than or equal to 1100 CFM, or greater than or equal to 1150 CFM. In certain embodiments, the air permeability of the charged fiber layer is less than or equal to 1200 CFM, less than or equal to 1150 CFM, less than or equal to 1100 CFM, less than or equal to 1050 CFM, less than or equal to 1000 CFM, less than or equal to 950 CFM, less than or equal to 900 CFM, less than or equal to 850 CFM, less than or equal to 800 CFM, less than or equal to 750 CFM, less than or equal to 700 CFM, less than or equal to 650 CFM, less than or equal to 600 CFM, less than or equal to 550 CFM, less than or equal to 500 CFM, less than or equal to 450 CFM, less than or equal to 400 CFM, less than or equal to 350 CFM, less than or equal to 300 CFM, less than or equal to 250 CFM, less than or equal to 200 CFM, less than or equal to 150 CFM, less than or equal to 100 CFM, less than or equal to 80 CFM, less than or equal to 50 CFM, or less than or equal to 25 CFM. Combinations of the above referenced ranges are also possible (e.g., greater than or equal to 10 CFM and less than or equal to 1200 CFM, greater than or equal to 80 CFM and less than or equal to 1200 CFM, greater than or equal to 50 CFM and less than or equal to 650 CFM). Other ranges are also possible. Air permeability of the second layer, as used herein, is measured according to the test standard ASTM D737 over 38 $cm^2$ surface area of the media and using a pressure of 125 Pa.

In some embodiments, the filter media comprises a first layer and a second layer as described above and herein. For example, in one set of embodiments, the filter media comprises an open support layer (i.e. the first layer) and a charged fiber layer (i.e. the second layer) mechanically attached to the open support layer. Referring again to FIG. 1A, in some embodiments, filter media 100 comprises an open support layer (i.e. first layer 110) mechanically attached to a charged fiber layer (i.e. second layer 120). In some such embodiments, the open support layer has an air permeability of greater than 1100 CFM and less than or equal to 20000 CFM and/or a solidity of less than or equal to 10%. In some cases, the open support layer may be a mesh. In some embodiments, the filter media includes an open support layer (e.g., a mesh) mechanically attached (e.g., needled) to a charged fiber layer comprising a plurality of fibers having a relatively low fiber diameter. Without wishing to be bound by theory, the incorporation of fibers having relatively low fiber diameters (e.g., less than 15 microns) increases the surface area of the fiber layer and generally increases filtration performance and/or provides a relatively low pressure drop across the fiber layer.

The filter media may comprise any suitable number of open support layers and/or charged fiber layers, each of which may or may not be mechanically attached to one another. For example, in some embodiments, the filter media may comprise a charged fiber layer disposed between two open support layers (e.g., a first open support layer upstream and mechanically attached to the charged fiber layer, and a second open support layer downstream and mechanically attached to the charged fiber layer). In certain embodiments, the filter media may comprise an open support layer disposed between two charged fiber layers (e.g., a first charged fiber layer upstream and mechanically attached to the open support layer and a second charged fiber layer downstream and mechanically attached to the open support layer). For example, referring again to FIG. 1B, in certain embodiments, filter media 102 may comprise an open support layer (i.e. first layer 110) disposed between a first charged layer (i.e. second layer 120) and a second charged layer (i.e. third layer 122).

Any suitable number of charged fiber layers may be present in the filter media. In some embodiments, the filter media may comprise one or more, two or more, three or more, or four or more charged fibers layers, one or more of which is mechanically attached to an open support layer. In certain embodiments, the filter media may comprise five or fewer, four or fewer, three or fewer, or two fewer charged fiber layers, one or more of which is mechanically attached to an open support layer. Combinations of the above-referenced ranges are also possible (e.g., 1-5 charged fiber layers). Other ranges are also possible.

Similarly, any suitable number of open support layers may be present in the filter media. In some embodiments, the filter media may comprise one or more, two or more, three or more, or four or more open support layers, one or more of which is mechanically attached to a charged fiber layer. In certain embodiments, the filter media may comprise five or fewer, four or fewer, three or fewer, or two fewer open support layers, one or more of which is mechanically attached to an charged fiber layer. Combinations of the above-referenced ranges are also possible (e.g., 1-5 open support layers). Other ranges are also possible.

Filter media having a charged fiber layer mechanically attached to an open support layer as described herein may have desirable structural properties such as overall basis weight and/or overall thickness. In some embodiments, the filter media may have an overall basis weight of greater than or equal to 12 $g/m^2$, greater than or equal to 20 $g/m^2$, greater than or equal to 25 $g/m^2$, greater than or equal to 30 $g/m^2$, greater than or equal to 40 $g/m^2$, greater than or equal to 50 $g/m^2$, greater than or equal to 60 $g/m^2$, greater than or equal to 70 $g/m^2$, greater than or equal to 80 $g/m^2$, greater than 85 $g/m^2$, greater than or equal to 90 $g/m^2$, greater than or equal to 100 $g/m^2$, greater than or equal to 150 $g/m^2$, greater than or equal to 200 $g/m^2$ $g/m^2$, greater than or equal to 250 $g/m^2$, greater than or equal to 300 $g/m^2$, greater than or equal to 350 $g/m^2$, greater than or equal to 400 $g/m^2$, greater than or equal to 450 $g/m^2$, greater than or equal to 500 $g/m^2$, greater than or equal to 550 $g/m^2$, greater than or equal to 600 $g/m^2$, greater than or equal to 650 $g/m^2$, or greater than or equal to 700 $g/m^2$. In some embodiments, the filter media may have an overall basis weight of less than or equal to 750 $g/m^2$, less than or equal to 700 $g/m^2$, less than or equal to 650 $g/m^2$, less than or equal to 600 $g/m^2$, less than or equal to 550 $g/m^2$, less than or equal to 500 g/m², less than or equal to 450 g/m², less than or equal to 400 g/m², less than or equal to 350 g/m², less than or equal to 300 g/m², less than or equal to 250 g/m², less than or equal to 200 g/m², less than or equal to 150 g/m², less than or equal to 100 g/m², less than or equal to 90 g/m², less than or equal to 85 g/m², less than or equal to 80 g/m², less than or equal to 70 g/m², less than or equal to 60 g/m², less than or equal to 50 g/m², less than or equal to 40 g/m², less than or equal to 30 g/m², less than or equal to 25 g/m², or less than or equal to 20 g/m². Combinations of the above-referenced ranges are also possible (e.g., an overall basis weight of greater than or equal to 12 g/m² and less than or equal to 750 g/m², greater than or equal to 25 g/m² and less than or equal to 650 g/m²). Other values of overall basis weight are also possible. The overall basis weight may be determined according to test standard ASTM D-846.

In some embodiments, the filter media (e.g., the filter media having a charged fiber layer mechanically attached to an open support layer) may have an overall thickness of greater than or equal to 5 mils, greater than or equal to 10 mils, greater than or equal to 15 mils, greater than or equal to 20 mils, greater than or equal to 30 mils, greater than or equal to 40 mils, greater than or equal to 50 mils, greater than or equal to 100 mils, greater than or equal to 150 mils, greater than or equal to 200 mils, greater than or equal to 250 mils, greater than or equal to 300 mils, greater than or equal to 350 mils, greater than or equal to 400 mils, greater than or equal to 450 mils, greater than or equal to 500 mils, or greater than or equal to 550 mils. In certain embodiments, the filter media has an overall thickness of less than or equal to 600 mils, less than or equal to 550 mils, less than or equal to 500 mils, less than or equal to 450 mils, less than or equal to 400 mils, less than or equal to 350 mils, less than or equal to 300 mils, less than or equal to 250 mils, less than or equal to 200 mils, less than or equal to 150 mils, less than or equal to 100 mils, less than or equal to 50 mils, less than or equal to 40 mils, less than or equal to 30 mils, less than or equal to 20 mils, less than or equal to 15 mils, or less than or equal to 10 mils. Combinations of the above-referenced ranges are also possible (e.g., an overall thickness of greater than or equal to 5 mils and less than or equal to 600 mils, greater than or equal to 30 mils and less than or equal to 350 mils). Other values of overall thickness are also possible. The overall thickness may be determined according to test standard ASTM D-1777.

Filter media having a charged fiber layer mechanically attached to an open support layer as described herein may have desirable filtration properties such as gamma, normalized gamma, pressure drop, and/or overall air permeability.

The filter media (e.g., the filter media comprising an open support layer mechanically attached to a charged fiber layer) may exhibit suitable overall air permeability characteristics. In some embodiments, the overall air permeability of a filter media may range from between about 30 CFM and about 1100 CFM. In some embodiments, the overall air permeability of the filter media may be greater than or equal to 30 CFM, greater than or equal to 50 CFM, greater than or equal to 75 CFM, greater than or equal to 100 CFM, greater than or equal to 150 CFM, greater than or equal to 200 CFM, greater than or equal to 300 CFM, greater than or equal to 400 CFM, greater than or equal to 500 CFM, greater than or equal to 600 CFM, greater than or equal to 700 CFM, greater than or equal to 800 CFM, greater than or equal to 900 CFM, or greater than or equal to 1000 CFM. In certain embodiments, the filter media has an overall air permeability of less than or equal to 1100 CFM, less than or equal to 1000 CFM, less than or equal to 900 CFM, less than or equal to 800 CFM, less than or equal to 700 CFM, less than or equal to 600 CFM, less than or equal to 500 CFM, less than or equal to 400 CFM, less than or equal to 300 CFM, less than or equal to 200 CFM, less than or equal to 100 CFM, less than or equal to 75 CFM, or less than or equal to 50 CFM. Combinations of the above-referenced ranges are also possible (e.g., an air permeability of greater than or equal to 30 CFM and less than or equal to 1100 CFM). Other ranges are also possible. Overall air permeability of the filter media, as determined herein, is measured according to the test standard ASTM D737 over 38 cm² surface area of the media and using a pressure of 125 Pa.

The pressure drop across the filter media (e.g., the filter media comprising an open support layer mechanically attached to a charged fiber layer) may vary depending on the particular application of the filter media. In some embodiments, for example, the pressure drop across the filter media may range from between 1 Pa and 120 Pa, or between 1 Pa and 100 Pa. In some embodiments, the pressure drop across the filter media may be greater than or equal to 1 Pa, greater than or equal to 2 Pa, greater than or equal to 5 Pa, greater than or equal to 10 Pa, greater than or equal to 20 Pa, greater than or equal to 30 Pa, greater than or equal to 40 Pa, greater than or equal to 50 Pa, greater than or equal to 60 Pa, greater than or equal to 70 Pa, greater than or equal to 80 Pa, greater than or equal to 90 Pa, greater than or equal to 100 Pa, or greater than or equal to 110 Pa. In certain embodiments, the pressure drop across the filter media may be less than or equal to 120 Pa, less than or equal to 110 Pa, less than or equal to 100 Pa, less than or equal to 90 Pa, less than or equal to 80 Pa, less than or equal to 70 Pa, less than or equal to 60 Pa, less than or equal to 50 Pa, less than or equal to 40 Pa, less than or equal to 30 Pa, less than or equal to 20 Pa, less than or equal to 10 Pa, less than or equal to 5 Pa, or less than or equal to 2 Pa. Combinations of the above-referenced ranges are also possible (e.g., a pressure drop of greater than or equal 1 Pa and less than or equal to 120 Pa, greater than or equal to 1 Pa and less than or equal to 100 Pa). Other ranges are also possible.

The pressure drop is measured as the differential pressure across the filter media or fiber layer when exposed to NaCl aerosol at a face velocity of 95 liters per minute. The face velocity is the velocity of air as it hits the upstream side of the filter media or filtration layer. Values of pressure drop are typically recorded as millimeters of water or Pascals. The values of pressure drop described herein were determined according to EN13274-7 standard. The pressure drop value is measured with NaCl aerosol of particle size 0.65 micron with a face velocity of 95 liters/min over an area of 100 cm².

In some embodiments, the filter media may have a desirable normalized efficiency. For instance, in some embodiments, the normalized efficiency of the filter media may be greater than or equal to 1, greater than or equal to 1.25, greater than or equal to 1.5, greater than or equal to 2, greater than or equal to 2.5, or greater than or equal to 3. In certain embodiments, the filter media may have a normalized efficiency of less than or equal to 3.5, less than or equal to 3, less than or equal to 2.5, less than or equal to 2, or less than or equal to 1.5. Combinations of the above-referenced ranges are also possible (e.g., greater than or equal to 1 and less than or equal to 3.5). Other values of the normalized efficiency of the filter media are also possible. Normalized efficiency is provided without units and refers to the ratio of the initial efficiency percentage of the filter media to the total basis weight (measured in g/m²) of the one or more charged fiber layers within the filter media (i.e. not including any open support layers or coarse support layers). Initial efficiency was determined according to EN13274-7 standard using NaCl aerosol of particle size 0.65 micron with a face velocity of 95 liters/min over an area of 100 cm².

Advantageously, filter media comprising an open support layer (e.g., having an air permeability greater than 1100 CFM) mechanically attached (e.g., needled) to a charged fiber layer may exhibit a decreased pressure drop and/or increased dust holding capacity as compared to a filter media with a support layer having an air permeability less than or equal to 1100 CFM adjacent to the charged fiber layer.

In some embodiments, the filter media may have a certain dust holding capacity. For instance, in some embodiments, the filter media may have a dust holding capacity of greater than or equal to 1 g/m², greater than or equal to 5 g/m², greater than or equal to 10 g/m², greater than or equal to 20 g/m², greater than or equal to 30 g/m², greater than or equal to 40 g/m², greater than or equal to 50 g/m², greater than or equal to 60 g/m², greater than or equal to 70 g/m², greater than or equal to 80 g/m², greater than or equal to 90 g/m², greater than or equal to 100 g/m², greater than or equal to 110 g/m², greater than or equal to 120 g/m², or greater than or equal to 130 g/m². In certain embodiments, the dust holding capacity of the filter media may be less than or equal to 140 g/m², less than or equal to 130 g/m², less than or equal to 120 g/m², less than or equal to 110 g/m², less than or equal to 100 g/m², less than or equal to 90 g/m², less than or equal to 80 g/m², less than or equal to 70 g/m², less than or equal to 60 g/m², less than or equal to 50 g/m², less than or equal to 40 g/m², less than or equal to 30 g/m², less than or equal to 20 g/m², less than or equal to 10 g/m², or less than or equal to 5 g/m². Combinations of the above-referenced ranges are also possible (e.g., greater than or equal to about 1 g/m² and less than or equal to about 140 g/m², greater than or equal to about 80 g/m² and less than or equal to about 140 g/m²). Other values of dust holding capacity are also possible. The dust holding capacity of a filter media comprising an open support layer mechanically attached to a charged fiber layer, not in a waved configuration is tested based upon standard ISO/TS 11155-1. The testing uses ISO 12103-1, A2 fine test dust at a base upstream gravimetric dust level of 75 mg/m³. The test is run at a face velocity of 20 cm/sec over a filter area of 100 cm² until filter media reaches an air resistance of 82 Pa.

Because it may be desirable to rate filter media or layer based on the relationship between penetration and pressure drop across the media, or particulate efficiency as a function of pressure drop across the media or web, filters may be rated according to a value termed gamma value. Generally, higher gamma values are indicative of better filter performance, i.e., a high particulate efficiency as a function of pressure drop. Gamma value is expressed according to the following formula:

gamma=(−log(initial NaCl penetration %/100)/pressure drop,$Pa$)×100×9.8, which is equivalent to:
gamma=(−log(initial NaCl penetration %/100)/pressure drop, mm H₂O)×100.

The NaCl penetration percentage is based on the percentage of particles that penetrate through the filter media or layer. With decreased NaCl penetration percentage (i.e., increased particulate efficiency) where particles are less able to penetrate through the filter media or layer, gamma increases. With decreased pressure drop (i.e., low resistance to fluid flow across the filter), gamma increases. These generalized relationships between NaCl penetration, pressure drop, and/or gamma assume that the other properties remain constant.

Penetration, often expressed as a percentage, is defined as follows: Pen (%)=(C/$C_0$)*100 where C is the particle concentration after passage through the filter and $C_0$ is the particle concentration before passage through the filter. Typical tests of penetration involve blowing sodium chloride (NaCl) particles through a filter media or layer and measuring the percentage of particles that penetrate through the filter media or layer. Penetration and pressure drop values described herein were determined using an 8130 CertiTest™ automated filter testing unit from TSI, Inc. equipped with a sodium chloride generator for NaCl aerosol testing based on EN13274-7 standard for NaCl particles. The average particle size created by the salt particle generator was 0.65 micron mass mean diameter. The instrument measured a pressure drop across the filter media and the resultant penetration value on an instantaneous basis. The initial penetration is the first taken at the beginning of the test and can be used to determine the initial efficiency of the filter media. Pressure drop values (e.g., for determining gamma) are determined using the EN13274-7 standard on a sodium flame photometer from SFP Services Ltd, UK. The instrument measures a pressure drop across the filter media (or layer) when the filter media or layer is subjected to a 95 liters/min face velocity over an area of 100 cm².

The filter media (e.g., the filter media comprising an open support layer mechanically attached to a charged fiber layer) as a whole may have a relatively high value of gamma. In some embodiments, the value of gamma for the filter is greater than or equal to 30, greater than or equal to 50, greater than or equal to 75, greater than or equal to 100, greater than or equal to 125, greater than or equal to 150, greater than or equal to 175, greater than or equal to 200, or greater than or equal to 225. In some embodiments, the value of gamma for the filter media is less than or equal to 250, less than or equal to 225, less than or equal to 200, less than or equal to 175, less than or equal to 150, less than or equal to 125, less than or equal to 100, less than or equal to 75, or less than or equal to 50. Combinations of the above-referenced ranges are also possible (e.g., greater than or equal to 30 and less than or equal to 250, or greater than or equal to 75 and less than or equal to 150). Other ranges are also possible.

The filter media (e.g., the filter media comprising an open support layer mechanically attached to a charged fiber layer) may have a desirable normalized gamma. Normalized gamma, as used herein, is a unitless parameter and refers to the ratio of the gamma of the filter media to the total basis weight (measured in g/m²) of the one or more charged fiber layers within the filter media (i.e. not including any open support layers or coarse support layers). In some embodiments, the normalized gamma of the filter media (e.g., the filter media comprising an open support layer mechanically attached to a charged fiber layer) may be greater than or equal to 1, greater than or equal to 1.5, greater than or equal to 2, greater than or equal to 2.5, greater than or equal to 3, greater than or equal to 3.5, greater than or equal to 4, greater than or equal to 4.5, greater than or equal to 5, greater than or equal to 5.5, greater than or equal to 5.6, greater than or equal to 6, greater than or equal to, greater than or equal to 6.5, greater than or equal to 7, greater than or equal to 7.5, greater than or equal to 8, greater than or equal to 8.5, greater than or equal to 9, greater than or equal to 9.5, greater than or equal to 10, or greater than or equal to 10.5. In certain embodiments, the normalized gamma of the filter media may be less than or equal to 10.9, less than or equal to 10.5, less than or equal to 10, less than or equal to 9.5, less than or equal to 9, less than or equal to 8.5, less than or equal to 8, less than or equal to 7.5, less than or equal to 7, less than or equal to 6.5, less than or equal to 6, less than or equal to 5.6, less than or equal to 5.5, less than or equal to 5, less than or equal to 4.5, less than or equal to 4, less than or equal to 3.5, less than or equal to 3, less than or equal to 2.5, less than or equal to 2, or less than or equal to 1.5. Combinations of the above-referenced ranges are also possible (e.g., a normalized gamma of the filter media of greater than or equal to 1 and less than or equal to 10.9, greater than or equal to 1 and less than or equal to 5.6). Other ranges are also possible. For example, in an exemplary embodiment, the filter media comprises a charged fiber layer comprising a plurality of fibers and the filter media has a normalized gamma of greater than or equal to 1 and less than or equal to 5.6. In another exemplary embodiment, the filter media comprises a plurality of fibers a charged fiber layer comprising a plurality of fibers that are relatively fine (e.g., having an average fiber diameter less than 15 microns) and the filter media has a normalized gamma of greater than or equal to 1 and less than or equal to 10.9.

As described herein, a filter media and/or a layer (e.g., a first layer, a second layer) may be designed to have a penetration or efficiency (e.g., initial efficiency). Penetration and (initial) efficiency are measured as described above. In general, (initial) efficiency is determined as 100−% Penetration. Penetration, expressed as a percentage, is defined as Pen=$(C/C_0)*100$, where C is the particle concentration after passage through the filter media and $C_0$ is the particle concentration before passage through the filter media.

In some embodiments, the initial efficiency of the filter media is greater than or equal to 50% greater than or equal to 55% greater than or equal to 60% greater than or equal to 65% greater than or equal to 70% greater than or equal to 75% greater than or equal to 80% greater than or equal to 85% greater than or equal to 90%, greater than or equal to 92%, greater than or equal to 95%, greater than or equal to 96%, greater than or equal to 97%, greater than or equal to 98%, greater than or equal to 99%, greater than or equal to 99.5%, greater than or equal to 99.8%, greater than or equal to 99.9%, or greater than or equal to 99.99%. In some embodiments, the initial efficiency of the filter media is less than or equal to 99.999%, less than or equal to 99.99%, less than or equal to 99.9%, less than or equal to 99.8%, less than or equal to 99.5%, less than or equal to 99%, less than or equal to 98%, less than or equal to 97%, less than or equal to 96%, less than or equal to 95%, less than or equal to 92%, less than or equal to 90%, less than or equal to 85%, less than or equal to 80%, less than or equal to 75%, less than or equal to 70%, less than or equal to 65%, less than or equal to 60%, or less than or equal to 55%. Combinations of the above-referenced ranges are also possible (e.g., an initial efficiency of greater than or equal to 50% and less than or equal to 99.999%, greater than or equal to 90% and less than or equal to 99.999%). Other ranges are also possible. Initial efficiency is determined as described above.

In an exemplary embodiment, the filter media may comprise an open support layer and a charged fiber layer mechanically attached to the open support layer, wherein the open support layer has an air permeability of greater than 1100 CFM and less than or equal to 20000 CFM and is a mesh. In some embodiments, the open support layer has a solidity of less than or equal to 10%.

In another exemplary embodiment, the filter media may comprise an open support layer and a charged fiber layer mechanically attached to the open support layer, wherein the open support layer has an air permeability of greater than 1100 CFM and less than or equal to 20000 CFM. In some embodiments, the filter media has an overall basis weight of greater than or equal to 12 g/m$^2$ and less than or equal to 700 g/m$^2$, a gamma greater than or equal to 90 and less than or equal to 250, and/or an overall air permeability of greater than or equal to 30 CFM and less than or equal to 1100 CFM. In some cases, the charged fiber layer may be needled to the open support layer.

In some embodiments, the filter media may comprise at least one layer (e.g., a charged fiber layer) that is held in a waved or curvilinear configuration. In certain embodiments, the filter media (and/or one or more open support layers of the filter media) are held in a waved or curvilinear configuration by one or more additional support layers (e.g., one or more coarse support layers). As a result of the waved configuration, advantageously, the filter media may have an increased surface area which can result in improved filtration properties. The filter media may include various layers (e.g., an open support layer, one or more fiber layers such as charged fiber layers, a coarse support layer, a top and/or bottom layer), and only some or all of the layers may be waved. Advantageously, the filter media having at least one layer that is held in a waved or curvilinear configuration as described herein, may comprise a relatively charged fiber layer having a relatively low basis weight.

Figure 2A:
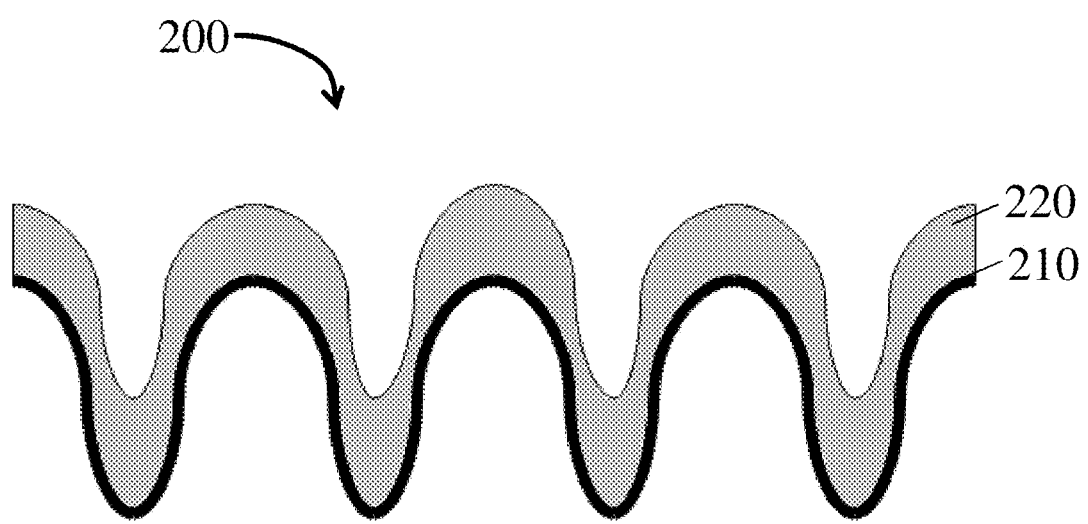
FIG. 2A is a schematic diagram showing a cross-section of a filter media according to one set of embodiments.
Figure 2B:
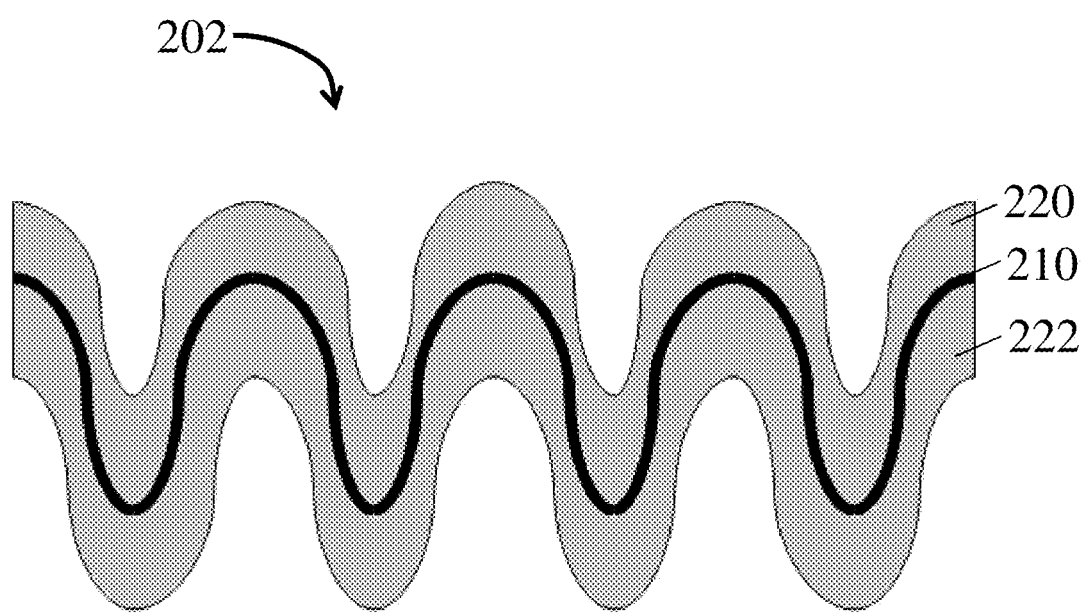
FIG. 2B is a schematic diagram showing a cross-section of a filter media according to one set of embodiments.

In some embodiments, an open support layer such as a mesh may provide additional mechanical reinforcement and/or structural stability (e.g., to a filter media having a waved configuration) while having a relatively high air permeability. FIG. 2A illustrates one exemplary embodiment of the filter media 200 having a first layer 210 (e.g., an open support layer such as a mesh) and a second layer 220 (e.g., a charged fiber layer) adjacent first layer 210. In the illustrated embodiment, first layer 210 and second layer 220 are in a waved configuration comprising peaks and troughs of adjacent waves of the filter media. As illustrated in FIG. 2B, in some embodiments, filter media 202 comprises first layer 210 (e.g. open support layer such as a mesh) disposed between second layer 220 (e.g., a first charged fiber layer) and third layer 222 (e.g., a second charged fiber layer).

Figure 2C:
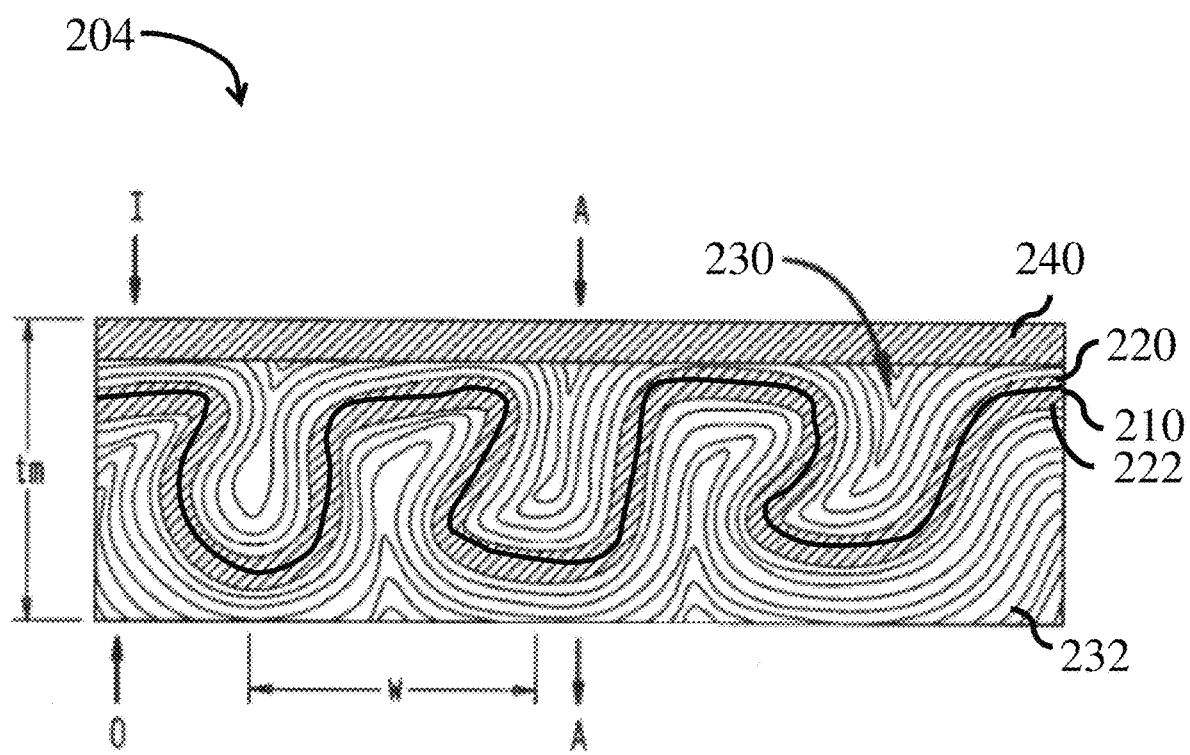
FIG. 2C is a schematic diagram showing a cross-section of a filter media according to one set of embodiments.

In certain embodiments, the filter media comprises a coarse support layer that holds the filtration layer in a waved configuration to maintain separation of peaks and troughs of adjacent waves of the filtration layer. As illustrated in FIG. 2C, filter media 204 includes a first layer 210 (e.g., an open support layer such as a mesh) disposed between second layer 220 (e.g., a first charged fiber layer) and third layer 230 (e.g., a second charged fiber layer). In the illustrated embodiment, filter media 204 comprises a first coarse support layer 230 adjacent second layer 220 and a second coarse support layer 232 adjacent third layer 222. Coarse support layers 230 and 232 can help maintain the second layer 220 and third layer 230, and optionally any additional layers (e.g., the open support layer), in the waved configuration. While two coarse support layers 230, 232 are shown, the filter media 204 need not include both coarse support layers. Where only one support layer is provided, the support layer can be disposed upstream or downstream of the filtration layer(s).

The filter media 204 can also optionally include one or more outer or cover layers located on the upstream-most and/or downstream-most sides of the filter media 204. FIG. 2C illustrates a top layer 240 disposed on the upstream side of the filter media 204 to function, for example, as an upstream dust holding layer and/or a support layer. The top layer 240 can also function as an aesthetic layer, which will be discussed in more detail below. The layers in the illustrated embodiment are arranged so that the top layer 240 is disposed on the air entering side, labeled I, the first coarse support layer 230 is just downstream of the top layer 240, the second fiber layer 220 is disposed just downstream of the first coarse support layer 230, the open support layer 210 is disposed downstream of the second fiber layer 220, the third fiber layer 222 is disposed downstream of the open support layer 210, and the second coarse support layer 232 is disposed downstream of the third fiber layer 222 on the air outflow side, labeled O. The direction of air flow, i.e., from air entering I to air outflow O, is indicated by the arrows marked with reference A. The outer or cover layer can alternatively or additionally be a bottom layer disposed on the downstream side of the filter media 204 to function as a strengthening component that provides structural integrity to the filter media 204 to help maintain the waved configuration. The outer or cover layer(s) can also function to offer abrasion resistance.

Furthermore, as shown in the exemplary embodiment illustrated in FIG. 2C, the outer or cover layer(s) can have a topography different from the topographies of the fiber filtration layer and/or any support layers. For example, in either a pleated or non-pleated configuration, the outer or cover layer(s) may be non-waved (e.g., substantially planar), whereas the fiber layer(s) and/or any open support layers may have a waved configuration. A person skilled in the art will appreciate that a variety of other configurations are possible, and that the filter media can include any number of layers in various arrangements.

Figure 2D:
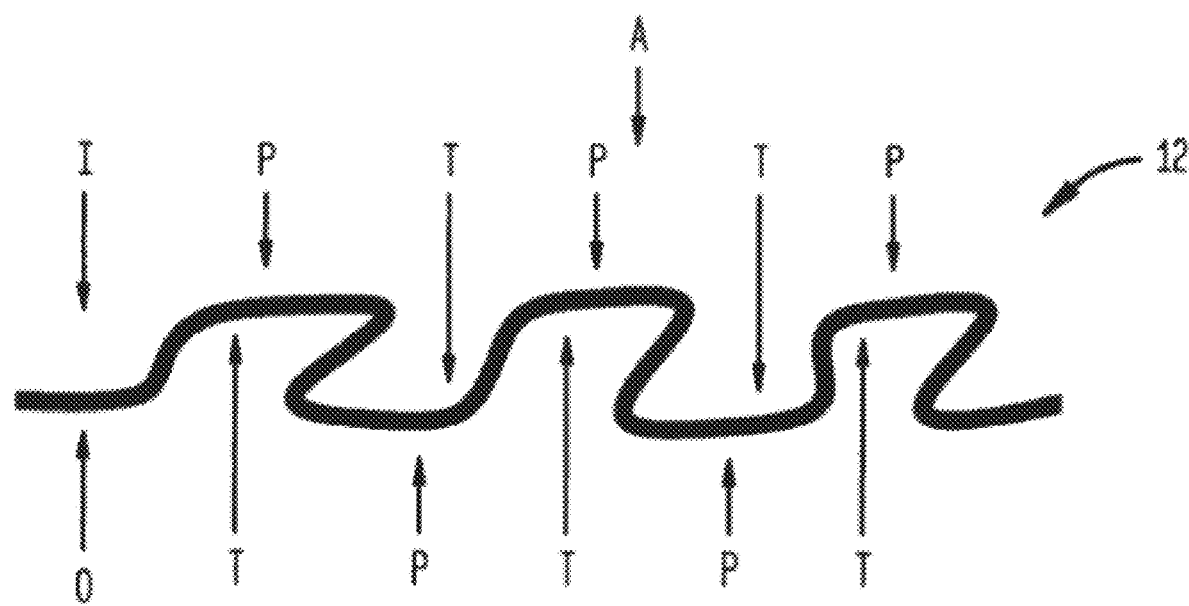
FIG. 2D is a schematic diagram showing a cross-section of a filter media according to one set of embodiments.

As shown illustratively in FIGS. 2C-2D, the fiber layers and/or support layers may have waved configuration including a plurality of peaks P and troughs T with respect to each surface thereof. A person skilled in the art may appreciate that a peak P on one side of the filtration layer may have a corresponding trough T on the opposite side. Thus, second layer 220 may extend into a trough T, and exactly opposite that same trough T is a peak P, across which upstream third layer 222 may extend. Peaks and troughs may also be present in a single filtration layer as shown illustratively in FIG. 2D. As shown illustratively in FIG. 2C, the troughs may be partially or substantially filled with fibers (e.g., partially or substantially filled with the coarse support layer).

Some or all of the fiber layers, and/or some or all of the support layers (e.g., the open support layer, one or more coarse support layers) can be formed into a waved configuration using various manufacturing techniques, but in an exemplary embodiment involving a single fiber layer, the fiber layer is positioned on a first moving surface adjacent to a second moving surface, and the fiber layer is conveyed between the first and second moving surfaces that are traveling at different speeds. In an example involving two or more fiber layers, the fiber layers are positioned adjacent to one another in a desired arrangement from air entering side to air outflow side, and the combined layers are conveyed between first and second moving surfaces that are traveling at different speeds. For instance, the second surface may be traveling at a speed that is slower than the speed of the first surface. In either arrangement, a suction force, such as a vacuum force, can be used to pull the layer(s) toward the first moving surface, and then toward the second moving surface as the layer(s) travel from the first to the second moving surfaces. The speed difference causes the layer(s) to form Z-direction waves as they pass onto the second moving surface, thus forming peaks and troughs in the layer(s). The speed of each surface as well as the ratio of speeds between the two surfaces can be altered to obtain a percentage of fiber orientations as described herein. Generally, a higher ratio of speeds results in a higher percentage of fibers having a more angled orientation with respect to the horizontal, or with respect to a surface (e.g., a planar surface) of the fiber layer or an outer or cover layer. In some embodiments, one or more fiber layers, or a filter media, is formed using a ratio of speeds of at least 1.5, at least 2.5, at least 3.5, at least 4.0, at least 4.5, at least 5.0, at least 5.5, or at least 6.0. In certain embodiments, the ratio of speeds is less than or equal to 10.0, less than or equal to 9.0, less than or equal to 8.0, less than or equal to 7.0, less than or equal to 6.0, less than or equal to 5.0, or less than or equal to 4.0, less than or equal to 3.5, less than or equal to 3.0, or less than or equal to 2.5. Combinations of the above-referenced ranges are also possible. Other ratios are also possible.

The speed of each surface can be also altered to obtain the desired number of waves per inch. The distance between the surfaces can also be altered to determine the amplitude of the peaks and troughs, and in an exemplary embodiment the distance is adjusted between 0 to 2". The properties of the different layers can also be altered to obtain a desired filter media configuration.

In some embodiments, the periodicity (e.g., the number of waves per inch) of the second layer (e.g., the charged fiber layer) may range between 10 and 40 waves per 6 inches (e.g., between 3 and 15 waves per 6 inches, between 5 and 9 waves per 6 inches). In some embodiments, the periodicity of the filtration layer may be greater than or equal to 3 waves, greater than or equal to 4 waves, greater than or equal to 5 waves, greater than or equal to 6 waves, greater than or equal to 7 waves, greater than or equal to 8 waves, greater than or equal to 9 waves, greater than or equal to 10 waves, greater than or equal to 11 waves, greater than or equal to 12 waves, greater than or equal to 13 waves, greater than or equal to 14 waves, greater than or equal to 15 waves, greater than or equal to 17 waves, greater than or equal to 20 waves, greater than or equal to 25 waves, greater than or equal to 30 waves, or greater than or equal to 35 waves per 6 inches. In certain embodiments, the periodicity of the second layer may be less than or equal to 40 waves, less than or equal to 35 waves, less than or equal to 30 waves, less than or equal to 25 waves, less than or equal to 20 waves, less than or equal to 17 waves, less than or equal to 15 waves, less than or equal to 14 waves, less than or equal to 13 waves, less than or equal to 12 waves, less than or equal to 11 waves, less than or equal to 10 waves, less than or equal to 9 waves, less than or equal to 8 waves, less than or equal to 7 waves, less than or equal to 6 waves, less than or equal to 5 waves, or less than or equal to 4 waves per 6 inches. Combinations of the above-referenced ranges are also possible (e.g., a periodicity of the second layer of greater than or equal to 10 and less than or equal to 40 waves per 6 inches, greater than or equal to 5 and less than or equal to 9 waves per 6 inches, greater than or equal to 3 and less than or equal to 15 waves per 6 inches). Other ranges of periodicities are also possible. Additionally, in embodiments in which one or more layers (e.g., a third layer such as a second charged fiber layer) are present in a media, each layer may have a periodicity having one or more of the above-referenced ranges.

Any suitable number of charged fiber layers may be present in the filter media (e.g., the filter media comprising an open support layer and one or more charged fiber layers, where at least one charged fiber layer is held in a waved or curvilinear configuration). In some embodiments, the filter media may comprise one or more, two or more, three or more, or four or more charged fibers layers, one or more of which is mechanically attached to an open support layer. In certain embodiments, the filter media may comprise five or fewer, four or fewer, three or fewer, or two fewer charged fiber layers, one or more of which is mechanically attached to an open support layer. Combinations of the above-referenced ranges are also possible (e.g., 1-5 charged fiber layers). Other ranges are also possible.

Similarly, any suitable number of open support layers may be present in the filter media. In some embodiments, the filter media may comprise one or more, two or more, three or more, or four or more open support layers, one or more of which is mechanically attached to a charged fiber layer. In certain embodiments, the filter media may comprise five or fewer, four or fewer, three or fewer, or two fewer open support layers, one or more of which is mechanically attached to an charged fiber layer. Combinations of the above-referenced ranges are also possible (e.g., 1-5 charged fiber layers). Other ranges are also possible.

Filter media having an open support layer, a coarse support layer, and a charged fiber layer, where at least the charged fiber layer is held in a waved or curvilinear configuration as described herein may have desirable structural properties such as overall basis weight. In some embodiments, the filter media may have an overall basis weight of greater than or equal to 30 g/m$^2$, greater than or equal to 40 g/m$^2$, greater than or equal to 50 g/m$^2$, greater than or equal to 60 g/m$^2$, greater than or equal to 70 g/m$^2$, greater than or equal to 80 g/m$^2$, greater than 85 g/m$^2$, greater than or equal to 90 g/m$^2$, greater than or equal to 100 g/m$^2$, greater than or equal to 150 g/m$^2$, greater than or equal to 200 g/m$^2$ g/m$^2$, greater than or equal to 250 g/m$^2$, greater than or equal to 300 g/m$^2$, greater than or equal to 350 g/m$^2$, greater than or equal to 400 g/m$^2$, greater than or equal to 450 g/m$^2$, greater than or equal to 500 g/m$^2$, greater than or equal to 550 g/m$^2$, greater than or equal to 600 g/m$^2$, greater than or equal to 650 g/m$^2$, greater than or equal to 700 g/m$^2$, or greater than or equal to 750 g/m$^2$. In some embodiments, the filter media may have an overall basis weight of less than or equal to 800 g/m$^2$, less than or equal to 750 g/m$^2$, less than or equal to 700 g/m$^2$, less than or equal to 650 g/m$^2$, less than or equal to 600 g/m$^2$, less than or equal to 550 g/m$^2$, less than or equal to 500 g/m$^2$, less than or equal to 450 g/m$^2$, less than or equal to 400 g/m$^2$, less than or equal to 350 g/m$^2$, less than or equal to 300 g/m$^2$, less than or equal to 250 g/m$^2$, less than or equal to 200 g/m$^2$, less than or equal to 150 g/m$^2$, less than or equal to 100 g/m$^2$, less than or equal to 90 g/m$^2$, less than or equal to 85 g/m$^2$, less than or equal to 80 g/m$^2$, less than or equal to 70 g/m$^2$, less than or equal to 60 g/m$^2$, less than or equal to 50 g/m$^2$, or less than or equal to 40 g/m$^2$. Combinations of the above-referenced ranges are also possible (e.g., an overall basis weight of greater than or equal to 30 g/m$^2$ and less than or equal to 800 g/m$^2$, greater than or equal to 100 g/m$^2$ and less than or equal to 450 g/m$^2$). Other values of overall basis weight are also possible. The overall basis weight may be determined according to test standard ASTM D-846.

In some embodiments, the filter media (e.g., the filter media comprising an open support layer, a coarse support layer, and one or more charged fiber layers, where at least one charged fiber layer is held in a waved or curvilinear configuration) has a particular thickness. In certain embodiments, the thickness of the overall filter media is greater than or equal to 100 mil, greater than or equal to 150 mil, greater than or equal to 200 mil, greater than or equal to 250 mil, greater than or equal to 300 mil, greater than or equal to 400 mil, greater than or equal to 500 mil, greater than or equal to 600 mil, greater than or equal to 700 mil, greater than or equal to 800 mil, greater than or equal to 900 mil, greater than or equal to 1000 mil, greater than or equal to 1500 mil, greater than or equal to 2000 mil, greater than or equal to 2500 mil, greater than or equal to 3000 mil, or greater than or equal to 3500 mil. In some embodiments, the thickness of the overall filter media is less than or equal to 4000 mil, less than or equal to 3500 mil, less than or equal to 3000 mil, less than or equal to 2500 mil, less than or equal to 2000 mil, less than or equal to 1500 mil, less than or equal to 1000 mil, less than or equal to 900 mil, less than or equal to 800 mil, less than or equal to 700 mil, less than or equal to 600 mil, less than or equal to 500 mil, less than or equal to 400 mil, less than or equal to 300 mil, less than or equal to 250 mil, less than or equal to 200 mil, or less than or equal to 150 mil. Combinations of the above-referenced ranges are also possible (e.g., a thickness of greater than or equal to 100 mil and less than or equal to 4000 mil, greater than 150 mil and less than or equal to 1000 mil). Other ranges are also possible. Thickness of the overall filter media as determined herein is measured according to TAPPI T411.

Filter media having an open support layer, a coarse support layer, and one or more charged fiber layers, where at least one charged fiber layer is held in a waved or curvilinear configuration as described herein may have desirable filtration properties such as dust holding capacity, gamma, pressure drop, and/or overall air permeability.

The filter media (e.g., the filter media comprising an open support layer, a coarse support layer, and one or more charged fiber layers, where at least one charged fiber layer is held in a waved or curvilinear configuration) may exhibit suitable overall air permeability characteristics. In some embodiments, the overall air permeability of a filter media may range from between about 10 CFM and about 1000 CFM. In some embodiments, the overall air permeability of the filter media may be greater than or equal to 10 CFM, greater than or equal to 25 CFM, greater than or equal to 50 CFM, greater than or equal to 75 CFM, greater than or equal to 100 CFM, greater than or equal to 150 CFM, greater than or equal to 200 CFM, greater than or equal to 300 CFM, greater than or equal to 400 CFM, greater than or equal to 500 CFM, greater than or equal to 600 CFM, greater than or equal to 700 CFM, greater than or equal to 800 CFM, or greater than or equal to 900 CFM. In certain embodiments, the filter media has an overall air permeability of less than or equal to 1000 CFM, less than or equal to 900 CFM, less than or equal to 800 CFM, less than or equal to 700 CFM, less than or equal to 600 CFM, less than or equal to 500 CFM, less than or equal to 400 CFM, less than or equal to 300 CFM, less than or equal to 200 CFM, less than or equal to 100 CFM, less than or equal to 75 CFM, less than or equal to 50 CFM, or less than or equal to 25 CFM. Combinations of the above-referenced ranges are also possible (e.g., an air permeability of greater than or equal to 10 CFM and less than or equal to 1000 CFM, greater than or equal to 100 CFM and less than or equal to 700 CFM). Other ranges are also possible. Overall air permeability of the filter media, as determined herein, is measured according to the test standard ASTM D737 over 38 cm$^2$ surface area of the media and using a pressure of 125 Pa.

The pressure drop across the filter media (e.g., the filter media comprising an open support layer, a coarse support layer, and one or more charged fiber layers, where at least one charged fiber layer is held in a waved or curvilinear configuration) may vary depending on the particular application of the filter media. In some embodiments, for example, the pressure drop across the filter media may range from between 2 Pa and 200 Pa, or between 3 Pa and 25 Pa. In some embodiments, the pressure drop across the filter media may be greater than or equal to 2 Pa, greater than or equal to 3 Pa, greater than or equal to 5 Pa, greater than or equal to 10 Pa, greater than or equal to 20 Pa, greater than or equal to 25 Pa, greater than or equal to 50 Pa, greater than or equal to 75 Pa, greater than or equal to 100 Pa, greater than or equal to 125 Pa, greater than or equal to 150 Pa, or greater than or equal to 175 Pa. In certain embodiments, the pressure drop across the filter media may be less than or equal to 200 Pa, less than or equal to 175 Pa, less than or equal to 150 Pa, less than or equal to 125 Pa, less than or equal to 100 Pa, less than or equal to 75 Pa, less than or equal to 50 Pa, less than or equal to 25 Pa, less than or equal to 20 Pa, less than or equal to 10 Pa, less than or equal to 5 Pa, or less than or equal to 3 Pa. Combinations of the above-referenced ranges are also possible (e.g., a pressure drop of greater than or equal 2 Pa and less than or equal to 200 Pa, greater than or equal to 3 Pa and less than or equal to 25 Pa). Other ranges are also possible.

The filter media described herein can have beneficial dust holding properties. In some embodiments, the filter media (e.g., the filter media comprising an open support layer, a coarse support layer, and one or more charged fiber layers, where at least one charged fiber layer is held in a waved or curvilinear configuration) may have a dust holding capacity (DHC) of greater than or equal to 5 $g/m^2$, greater than or equal to 10 $g/m^2$, greater than or equal to 25 $g/m^2$, greater than or equal to 50 $g/m^2$, greater than or equal to 75 $g/m^2$, greater than or equal to 100 $g/m^2$, greater than or equal to 150 $g/m^2$, greater than or equal to 200 $g/m^2$, greater than or equal to 250 $g/m^2$, greater than or equal to 300 $g/m^2$, greater than or equal to 350 $g/m^2$, greater than or equal to 400 $g/m^2$, greater than or equal to 450 $g/m^2$, greater than or equal to 500 $g/m^2$, or greater than or equal to 550 $g/m^2$. In some embodiments, the DHC of the filter media may be less than or equal to 600 $g/m^2$, less than or equal to 550 $g/m^2$, less than or equal to 500 $g/m^2$, less than or equal to 450 $g/m^2$, less than or equal to 400 $g/m^2$, less than or equal to 350 $g/m^2$, less than or equal to 300 $g/m^2$, less than or equal to 250 $g/m^2$, less than or equal to 200 $g/m^2$, less than or equal to 150 $g/m^2$, less than or equal to 100 $g/m^2$, less than or equal to 75 $g/m^2$, less than or equal to 50 $g/m^2$, less than or equal to 25 $g/m^2$, or less than or equal to 10 $g/m^2$. Combinations of the above-referenced ranges are also possible (e.g., a DHC of greater than or equal to 5 $g/m^2$ and less than or equal to 600 $g/m^2$, greater than or equal to 200 $g/m^2$ and less than or equal to 350 $g/m^2$). Other ranges are also possible.

The dust holding capacity of a filter media comprising an open support layer, a coarse support layer, and one or more charged fiber layers, where at least one charged fiber layer is held in a waved or curvilinear configuration is tested based on the ASHRAE 52.2 standard. The testing uses ASHRAE test dust at a base upstream gravimetric dust level of 70 $mg/m^2$. The test is run at a face velocity of 0.944 $m^3/s$ (3400 $m^3/h$) until a terminal pressure of 450 Pa.

The filter media (e.g., the filter media comprising an open support layer and one or more charged fiber layers, where at least one charged fiber layer is held in a waved or curvilinear configuration) as a whole may have a relatively high value of gamma. In some embodiments, the value of gamma for the filter is greater than or equal to 20, greater than or equal to 30, greater than or equal to 50, greater than or equal to 75, greater than or equal to 100, greater than or equal to 125, greater than or equal to 150, greater than or equal to 175, greater than or equal to 200, or greater than or equal to 225. In some embodiments, the value of gamma for the filter media is less than or equal to 250, less than or equal to 225, less than or equal to 200, less than or equal to 175, less than or equal to 150, less than or equal to 125, less than or equal to 100, less than or equal to 75, less than or equal to 50, or less than or equal to 30. Combinations of the above-referenced ranges are also possible (e.g., greater than or equal to 20 and less than or equal to 250, or greater than or equal to 75 and less than or equal to 150). Other ranges are also possible. Gamma is determined as described above.

The filter media (e.g., the filter media comprising an open support layer, a coarse support layer, and one or more charged fiber layers, where at least one charged fiber layer is held in a waved or curvilinear configuration) may be designed to have a particular initial efficiency (e.g., initial efficiency).

In some embodiments, the initial efficiency of the filter media (e.g., the filter media comprising an open support layer, a coarse support layer, and one or more charged fiber layers, where at least one charged fiber layer is held in a waved or curvilinear configuration is greater than or equal to 50% greater than or equal to 55% greater than or equal to 60% greater than or equal to 65% greater than or equal to 70% greater than or equal to 75% greater than or equal to 80% greater than or equal to 85% greater than or equal to 90%, greater than or equal to 92%, greater than or equal to 95%, greater than or equal to 96%, greater than or equal to 97%, greater than or equal to 98%, greater than or equal to 99%, greater than or equal to 99.5%, greater than or equal to 99.8%, greater than or equal to 99.9%, or greater than or equal to 99.99%. In some embodiments, the initial efficiency of the filter media is less than or equal to 99.999%, less than or equal to 99.99%, less than or equal to 99.9%, less than or equal to 99.8%, less than or equal to 99.5%, less than or equal to 99%, less than or equal to 98%, less than or equal to 97%, less than or equal to 96%, less than or equal to 95%, less than or equal to 92%, less than or equal to 90%, less than or equal to 85%, less than or equal to 80%, less than or equal to 75%, less than or equal to 70%, less than or equal to 65%, less than or equal to 60%, or less than or equal to 55%. Combinations of the above-referenced ranges are also possible (e.g., an initial efficiency of greater than or equal to 50% and less than or equal to 99.999%, greater than or equal to 90% and less than or equal to 99.999%). Other ranges are also possible.

In an exemplary embodiment, the filter media comprises a charged fiber layer, an open support layer mechanically attached to the charged fiber layer and a coarse support layer that holds the charged fiber layer in a waved configuration and maintains separation of peaks and troughs of adjacent waves of the charged fiber layer. In some embodiments, the charged fiber layer has a basis weight of less than or equal to 12 $g/m^2$ and greater than or equal to 700 $g/m^2$. In certain embodiments, the open support layer has an air permeability of greater than 1100 CFM and less than or equal to 20000 CFM. In some embodiments, the filter media has an overall air permeability of greater than or equal to 10 CFM and less than or equal to 1000 CFM.

As described above and herein, in some embodiments, the filter media comprises one or more coarse support layers (e.g., that holds the charged fiber layer in a waved configuration and maintains separation of peaks and troughs of adjacent waves of the charged fiber layer).

Referring again to FIG. 2C, the coarse support layers 230, 232 can be formed from a variety of fibers types and sizes. In an exemplary embodiment, the downstream coarse support layer 232 is formed from fibers having an average fiber diameter that is greater than or equal to an average fiber diameter of the second layer 220 and/or third layer 222, the upstream coarse support layer 230, and the top layer 240, if provided. In some cases, the upstream support layer 230 is formed from fibers having an average fiber diameter that is less than or equal to an average fiber diameter of the downstream support layer 232, but that is greater than an average fiber diameter of the second layer 220 and/or third layer 222.

The fibers of the coarse support layer(s) (e.g., the downstream support layer, the upstream support layer) may have an average fiber length of, for example, between about 0.5 inches and 6.0 inches (e.g., between 1.5 inches and 3 inches). In some embodiments, the fibers of the coarse support layer may have an average fiber length of less than or equal to 6 inches, less than or equal to 5.5 inches, less than or equal to 5 inches, less than or equal to 4.5 inches, less than or equal to 4 inches, less than or equal to 3.5 inches, less than or equal to 3 inches, less than or equal to 2.5 inches, less than or equal to 2 inches, or less than or equal to 1 inch. In certain embodiments, the fibers of the coarse support layer may have an average fiber length of greater than or equal to 0.5 inches, greater than or equal to 1 inch, greater than or equal to 1.5 inches, greater than or equal to 2 inches, greater than or equal to 2.5 inches, greater than or equal to 3 inches, greater than or equal to 3.5 inches, greater than or equal to 4 inches, greater than or equal to 4.5 inches, greater than or equal to 5 inches, or greater than or equal to 5.5 inches. Combinations of the above-referenced ranges are also possible (e.g., greater than or equal to 0.5 inches and less than or equal to 6 inches, greater than or equal to 1.5 inches and less than or equal to 3 inches). Other ranges are also possible.

In some embodiments, the plurality of fibers in the coarse support layer(s) may have an average fiber diameter of greater than or equal to 8 microns, greater than or equal to 10 microns, greater than or equal to 12 microns, greater than or equal to 15 microns, greater than or equal to 20 microns, greater than or equal to 25 microns, greater than or equal to 30 microns, greater than or equal to 35 microns, greater than or equal to 40 microns, greater than or equal to 45 microns, greater than or equal to 50 microns, greater than or equal to 55 microns, greater than or equal to 60 microns, greater than or equal to 65 microns, greater than or equal to 70 microns, greater than or equal to 75 microns, or greater than or equal to 80 microns. In some embodiments, the plurality of fibers in the coarse support layer(s) may have an average fiber diameter of less than or equal to 85 microns, less than or equal to 80 microns, less than or equal to 75 microns, less than or equal to 70 microns, less than or equal to 65 microns, less than or equal to 60 microns, less than or equal to 55 microns, less than or equal to 50 microns, less than or equal to 45 microns, less than or equal to 40 microns, less than or equal to 35 microns, less than or equal to 30 microns, less than or equal to 25 microns, less than or equal to 20 microns, less than or equal to 15 microns, less than or equal to 12 microns, or less than or equal to 10 microns. Combinations of the above-referenced ranges are also possible (e.g., greater than or equal to 8 micron and less than or equal to 85 microns, greater than or equal to 12 microns and less than or equal to 60 microns). Other values of average fiber diameter for the coarse support layer(s) are also possible.

Various materials can also be used to form the fibers of the coarse support layers including synthetic and non-synthetic materials. In one exemplary embodiment, the coarse support layer(s) are formed from staple fibers, and in particular from a combination of binder fibers and non-binder fibers. The binder fibers can be formed from any material that is effective to facilitate thermal bonding between the layers, and will thus have an activation temperature that is lower than the melting temperature of the non-binder fibers. The binder fibers can be monocomponent fibers or any one of a number of bicomponent binder fibers. In one embodiment, the binder fibers can be bicomponent fibers, and each component can have a different melting temperature. For example, the binder fibers can include a core and a sheath where the activation temperature of the sheath is lower than the melting temperature of the core. This allows the sheath to melt prior to the core, such that the sheath binds to other fibers in the layer, while the core maintains its structural integrity. This may be particularly advantageous in that it creates a more cohesive layer for trapping filtrate. The core/sheath binder fibers can be concentric or non-concentric, and exemplary core/sheath binder fibers can include the following: a polyester core/copolyester sheath, a polyester core/polyethylene sheath, a polyester core/polypropylene sheath, a polypropylene core/polyethylene sheath, a polyamide core/polyethylene sheath, and combinations thereof. Other exemplary bicomponent binder fibers can include split fiber fibers, side-by-side fibers, and/or "island in the sea" fibers.

The non-binder fibers can be synthetic and/or non-synthetic, and in an exemplary embodiment the non-binder fibers can be about 100 percent synthetic. In general, synthetic fibers are preferred over non-synthetic fibers for resistance to moisture, heat, long-term aging, and microbiological degradation. Exemplary synthetic non-binder fibers can include polyesters, acrylics, polyolefins, nylons, rayons, and combinations thereof. Alternatively, the non-binder fibers used to form the coarse support layer(s) can include non-synthetic fibers such as glass fibers, glass wool fibers, cellulose pulp fibers, such as wood pulp fibers, and combinations thereof.

Non-limiting examples of suitable synthetic fibers include polyester, polyaramid, polyimide, polyolefin (e.g., polyethylene), polypropylene, Kevlar, Nomex, halogenated polymers (e.g., polyethylene terephthalate), acrylics, polyphenylene oxide, polyphenylene sulfide, and combinations thereof. The coarse support layer(s) can also be formed using various techniques known in the art, including melt-blowing, wet laid techniques, air laid techniques, carding, and spunbonding. In an exemplary embodiment, however, the coarse support layers are carded or airlaid webs. The resulting layers can also have a variety of thicknesses, air permeabilities, and basis weights depending upon the requirements of a desired application. In one exemplary embodiment, the downstream coarse support layer and the upstream coarse support layer, as measured in a planar configuration, each have a thickness in the range of 2 mil to 1000 mil (e.g., between 12 mil to 100 mil) and a basis weight in the range of 5 g/m$^2$ to 100 g/m$^2$ (e.g., between 12 g/m$^2$ and 40 g/m$^2$).

For example, in some embodiments, the thickness of one or more coarse support layer(s) is greater than or equal to 2 mil, greater than or equal to 3 mil, greater than or equal to 5 mil, greater than or equal to 10 mil, greater than or equal to 12 mil, greater than or equal to 15 mil, greater than or equal to 25 mil, greater than or equal to 50 mil, greater than or equal to 75 mil, greater than or equal to 100 mil, greater than or equal to 150 mil, greater than or equal to 200 mil, greater than or equal to 250 mil, greater than or equal to 300 mil, greater than or equal to 400 mil, greater than or equal to 500 mil, greater than or equal to 600 mil, greater than or equal to 700 mil, greater than or equal to 800 mil, or greater than or equal to 900 mil. In certain embodiments, the thickness of one or more coarse support layer(s) is less than or equal to 1000 mil, less than or equal to 900 mil, less than or equal to 800 mil, less than or equal to 700 mil, less than or equal to 600 mil, less than or equal to 500 mil, less than or equal to 400 mil, less than or equal to 300 mil, less than or equal to 250 mil, less than or equal to 200 mil, less than or equal to 150 mil, less than or equal to 100 mil, less than or equal to 75 mil, less than or equal to 50 mil, less than or equal to 25 mil, less than or equal to 15 mil, less than or equal to 12 mil, less than or equal to 10 mil, less than or equal to 5 mil, or less than or equal to 3 mil. Combinations of the above referenced ranges are also possible (e.g., a thickness of greater than or equal to 2 mil and less than or equal to 1000 mil, greater than or equal to 12 mil and less than or equal to 100 mil). Other ranges are also possible.

In some instances, the coarse support layer(s) may each have a basis weight of less than or equal to 100 $g/m^2$, less than or equal to 90 $g/m^2$, less than or equal to 85 $g/m^2$, less than or equal to 80 $g/m^2$, less than or equal to 70 $g/m^2$, less than or equal to 60 $g/m^2$, less than or equal to 50 $g/m^2$, less than or equal to 40 $g/m^2$, less than or equal to 30 $g/m^2$, less than or equal to 25 $g/m^2$, less than or equal to 12 $g/m^2$, or less than or equal to 10 $g/m^2$. In some embodiments, the coarse support layer may have a basis weight of greater than or equal to 5 $g/m^2$, greater than or equal to 10 $g/m^2$, greater than or equal to 12 $g/m^2$, greater than or equal to 25 $g/m^2$, greater than or equal to 30 $g/m^2$, greater than or equal to 40 $g/m^2$, greater than or equal to 50 $g/m^2$, greater than or equal to 60 $g/m^2$, greater than or equal to 70 $g/m^2$, greater than or equal to 80 $g/m^2$, greater than 85 $g/m^2$, or greater than or equal to 90 $g/m^2$. Combinations of the above-referenced ranges are also possible (e.g., a basis weight of less than or equal to 100 $g/m^2$ and greater than or equal to 5 $g/m^2$, a basis weight of less than or equal to 40 $g/m^2$ and greater than or equal to 12 $g/m^2$). Other values of basis weight are also possible.

In some embodiments, the filter media can also optionally include one or more outer or cover layers (e.g., a top layer, a bottom layer) disposed on the air entering side I and/or the air outflow side O (as illustrated in FIG. 2C). The cover layer can function as a dust loading layer and/or it can function as an aesthetic layer and/or a support layer. In an exemplary embodiment, the cover layer is a planar layer that is mated to the filter media after the charged fiber layer(s) and, optionally, other layer(s) are waved. The cover layer thus provides a top surface that is aesthetically pleasing. The cover layer can be formed from a variety of fiber types and sizes, but in an exemplary embodiment the cover layer is formed from fibers having an average fiber diameter that is less than an average fiber diameter of the coarse support layer(s) directly adjacent the cover layer, but that is greater than an average fiber diameter of the charged fiber layer(s) (e.g., the second layer). In certain exemplary embodiments, the cover layer is formed from fibers having an average fiber diameter in the range of about 5 μm to 20 μm.

Various materials can also be used to form the fibers of the outer or cover layer, including synthetic and non-synthetic materials. In one exemplary embodiment, the outer or cover layer is formed from staple fibers, and in particular from a combination of binder fibers and non-binder fibers. One suitable fiber composition is a blend of at least about 20% binder fiber and a balance of non-binder fiber. A variety of types of binder and non-binder fibers can be used to form the media of the present invention, including those previously discussed above with respect to the open support layer(s) and/or the coarse support layer(s).

The outer or cover layer can also be formed using various techniques known in the art, including meltblowing, wet laid techniques, air laid techniques, carding, and spunbonding. In an exemplary embodiment, a top layer is an airlaid layer and a bottom layer is a spunbond layer. The resulting layer can also have a variety of thicknesses, air permeabilities, and basis weights depending upon the requirements of a desired application.

As described above, in some embodiments, a layer of the filter media (e.g., the first layer, the second layer, one or more coarse support layer(s)) may be a non-wet laid layer formed using a non-wet laid process (e.g., an air laid process, a carding process, a meltblown process). For example, in a non-wet laid process, an air laid process or a carding process may be used. For example, in an air laid process, fibers may be mixed while air is blown onto a conveyor. In a carding process, in some embodiments, the fibers are manipulated by rollers and extensions (e.g., hooks, needles) associated with the rollers.

In some embodiments, as described herein, a layer of the filter media may include fibers formed from a meltblown process. In embodiments in which the filter media includes a meltblown layer, the meltblown layer may have one or more characteristics described in commonly-owned U.S. Pat. No. 8,608,817, entitled "Meltblown Filter Medium", issued on Dec. 17, 2013, which is based on U.S. patent application Ser. No. 12/266,892 filed on May 14, 2009, commonly-owned U.S. Patent Publication No. 2012/0152824, entitled "Fine Fiber Filter Media and Processes", which is based on patent application Ser. No. 12/971,539 filed on Dec. 17, 2010, commonly-owned U.S. Patent Publication No. 2012/0152824, entitled "Fine Fiber Milter Media and Processes", which is based on patent application Ser. No. 12/971,539 filed on Dec. 17, 2010, and commonly-owned U.S. Patent Publication No. 2012/0152821, entitled "Fine Fiber Milter Media and Processes", which is based on patent application Ser. No. 12/971,594 filed on Dec. 17, 2010, each of which is incorporated herein by reference in its entirety for all purposes.

For example, in an exemplary embodiment, the filter media comprises a charged fiber layer comprising a plurality of fibers, wherein at least a portion of the plurality of fibers are formed from a meltblown process.

The filter media may be used for a number of applications, such as respirator and face mask applications, cabin air filtration, military garments, HVAC systems (e.g., for industrial areas and buildings), clean rooms, vacuum filtration, furnace filtration, room air cleaning, high-efficiency particulate arrestance (HEPA) filters, ultra-low particular air (ULPA) filters, and respirator protection equipment (e.g., industrial respirators). In some embodiments, the filter media may be incorporated into a face mask.

The filter media can be, for example, folded, edge sealed, collated, or molded, with or without a supporting structure, within the face mask. The face mask may be a full face piece or a half face piece, and may be disposable or reusable. In general, face masks are used to protect the respiratory system when the air contains hazardous amounts of particulate contaminants in the form of solid particles or liquid droplets that can cause impairment through inhalation. Accordingly, a face mask generally needs to provide adequate protection with good breathability (e.g., low resistance). The face mask may be designed to filter dust, fog, fumes, vapors, smoke, sprays or mists. For example, face masks may be worn in areas where activities such as grinding, welding, road paving (e.g., where hot asphalt fumes are present), coal mining, transferring diesel fuel, or pesticide spraying are performed. The face mask may also be designed for wearing in hospitals (e.g., performing surgery), distillers and refineries in chemical industries, painting facilities, or oil fields. For example, the face mask may be a surgical face mask or an industrial face mask.

The filter media may be incorporated into a variety of other suitable filter elements for use in various applications including gas filtration. For example, the filter media may be used in heating and air conditioning ducts. Filter elements may have any suitable configuration as known in the art including bag filters and panel filters. Filter assemblies for filtration applications can include any of a variety of filter media and/or filter elements. The filter elements can include the above-described filter media and/or layers (e.g., first layer, second layer). Examples of filter elements include gas turbine filter elements, dust collector elements, heavy duty air filter elements, automotive air filter elements, air filter elements for large displacement gasoline engines (e.g., SUVs, pickup trucks, trucks), HVAC air filter elements, HEPA filter elements, ULPA filter elements, and vacuum bag filter elements.

Filter elements can be incorporated into corresponding filter systems (gas turbine filter systems, heavy duty air filter systems, automotive air filter systems, HVAC air filter systems, HEPA filter systems, ULPA filter system, and vacuum bag filter systems). The filter media can optionally be pleated into any of a variety of configurations (e.g., panel, cylindrical).

Filter elements can also be in any suitable form, such as radial filter elements, panel filter elements, or channel flow elements. A radial filter element can include pleated filter media that are constrained within two open wire support materials in a cylindrical shape.

In some cases, the filter element includes a housing that may be disposed around the filter media. The housing can have various configurations, with the configurations varying based on the intended application. In some embodiments, the housing may be formed of a frame that is disposed around the perimeter of the filter media. For example, the frame may be thermally sealed around the perimeter. In some cases, the frame has a generally rectangular configuration surrounding all four sides of a generally rectangular filter media. The frame may be formed from various materials, including for example, cardboard, metal, polymers, or any combination of suitable materials. The filter elements may also include a variety of other features known in the art, such as stabilizing features for stabilizing the filter media relative to the frame, spacers, or any other appropriate feature.

As noted above, in some embodiments, the filter media can be incorporated into a bag (or pocket) filter element. A bag filter element may be formed by any suitable method, e.g., by placing two filter media together (or folding a single filter media in half), and mating three sides (or two if folded) to one another such that only one side remains open, thereby forming a pocket inside the filter. In some embodiments, multiple filter pockets may be attached to a frame to form a filter element. It should be understood that the filter media and filter elements may have a variety of different constructions and the particular construction depends on the application in which the filter media and elements are used.

The filter elements may have the same property values as those noted above in connection with the filter media and/or layers. For example, the above-noted instantaneous resistances, efficiencies, (total) thicknesses, and/or basis weight may also be found in filter elements. During use, the filter media mechanically trap contaminant particles on the filter media as fluid (e.g., air) flows through the filter media.

Other systems, devices, and applications are also possible and those skilled in the art would be capable of selecting such systems, devices, and applications based upon the teachings of this specification.

EXAMPLES

The following example demonstrates the formation of a filter media comprising an open support layer and a charged fiber layer, according to some embodiments.

Sample 1 included several filter media of varying basis weight comprising:
  a charged filter media having a basis weight between 20 $g/m^2$ and 85 $g/m^2$, comprising a plurality of charged fibers having an average fiber diameter of greater than or equal to 15 microns; and
  a support layer comprising a scrim and having an air permeability of less than or equal to 1100 CFM, needled to the charged filter media.

Sample 2 included several filter media of varying basis weight comprising:
  a charged filter media having a basis weight between 20 $g/m^2$ and 85 $g/m^2$, comprising a plurality of charged fibers having an average fiber diameter of less than 15 microns; and
  an open support layer (a mesh) having an air permeability of greater than 1100 CFM, needled to the charged filter media.

The mesh of sample 2 comprised polypropylene strands having a strand count of 5 per inch along a first axis and 6 per inch in along a second axis.

Figure 3:
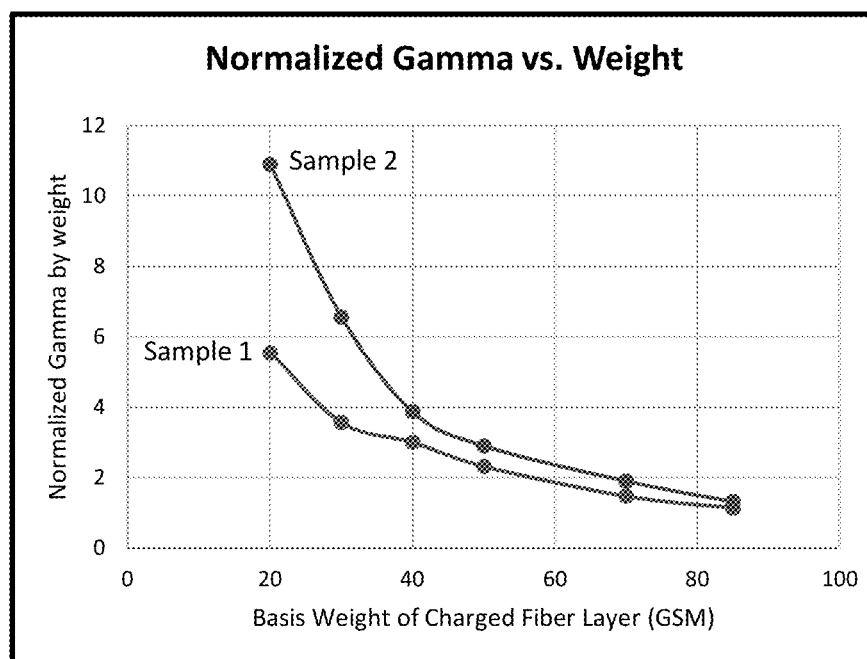
FIG. 3 is a plot of normalized gamma of exemplary filter media versus basis weight of a charged fiber layer of the filter media, with or without an open support layer, according to one set of embodiments.
Figure 4:
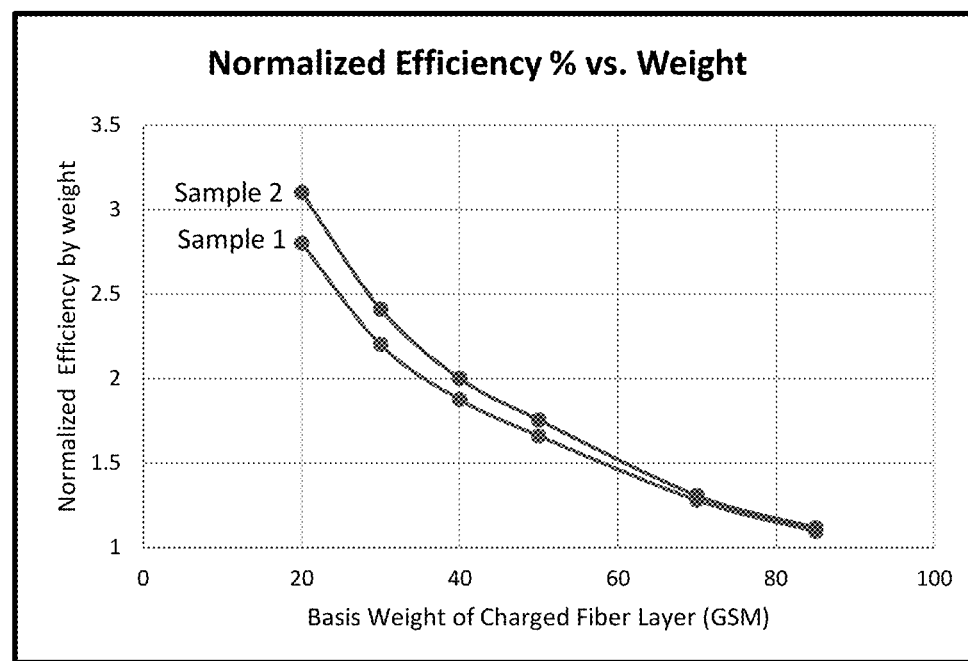
FIG. 4 is a plot of normalized efficiency of exemplary filter media versus basis weight of a charged fiber layer of the filter media, with or without an open support layer, according to one set of embodiments.

FIG. 3 shows a plot of the normalized gamma versus the basis weight of the charged fiber layer. FIG. 4 shows a plot of the normalized efficiency versus the basis weight of the charged fiber layer. Sample 2 filter media demonstrated an increase in normalized gamma and normalized efficiency, even at relatively low basis weights of the charged fiber layer, as compared to Sample 1.

Figure 5:
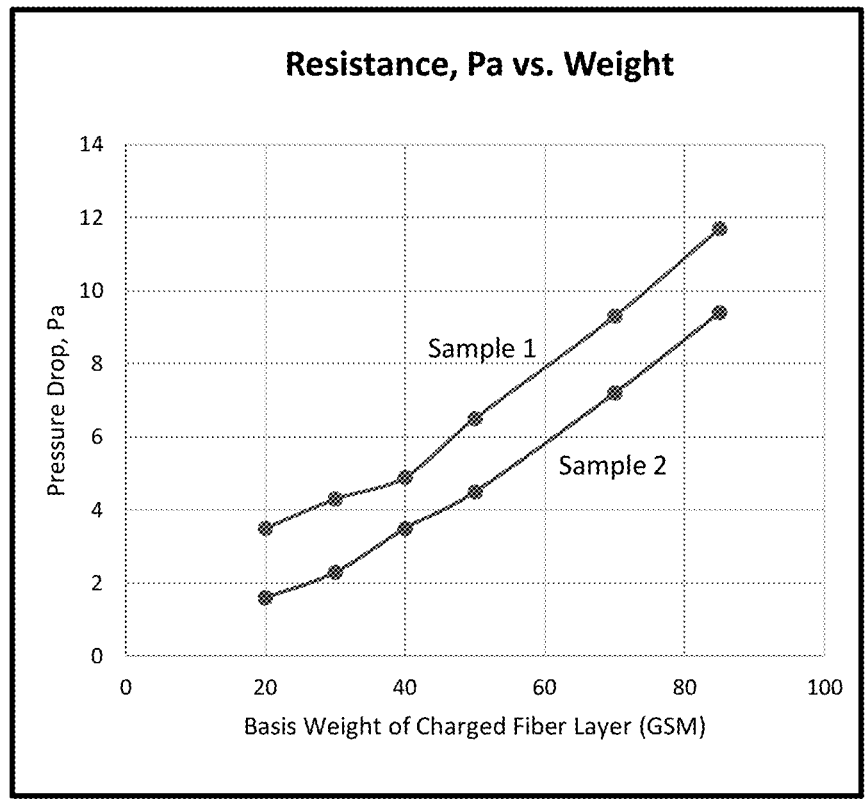
FIG. 5 is a plot of pressure drop (Pa) of exemplary filter media, versus basis weight of a charged fiber layer, with or without an open support layer, according to one set of embodiments.

FIG. 5 is a plot of pressure drop (Pa) versus basis weight of the charged fiber layer. Sample 2 filter media demonstrated a decrease in resistance as compared to Sample 1.

Figure 6:
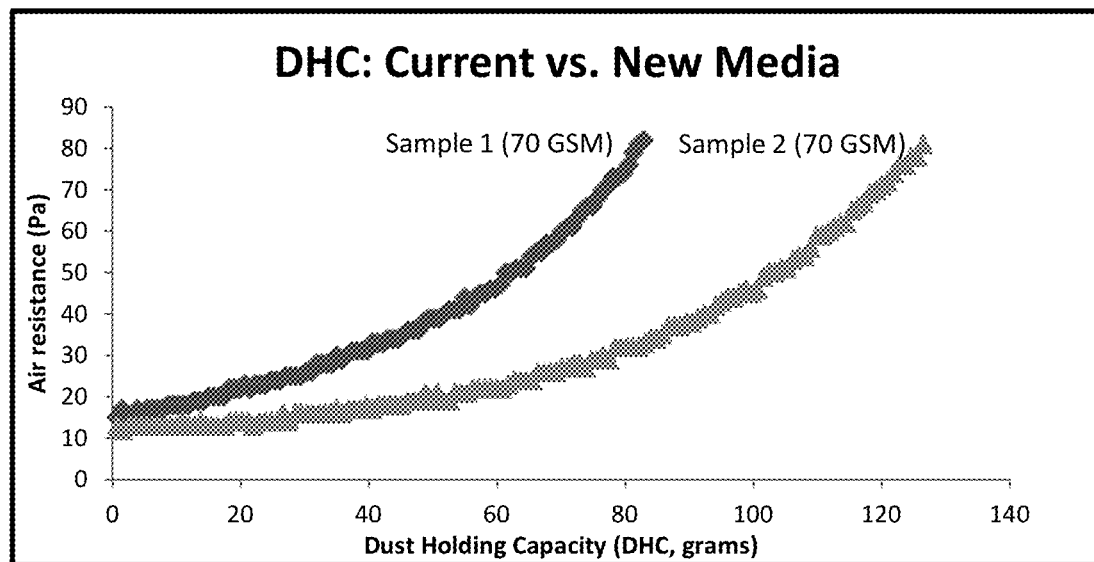
FIG. 6 is a plot of air resistance versus dust holding capacity of exemplary filter media having a basis weight of 70 $g/m^2$, each filter media comprising a charged fiber with or without an open support layer, according to one set of embodiments.

FIG. 6 is a plot of dust holding capacity for Sample 1 having a basis weight of 70 $g/m^2$ versus Sample 2 having a basis weight of 70 $g/m^2$. Sample 2 filter media demonstrated a significant increase in dust holding capacity for a given air resistance of the filter media, as compared to Sample 1.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in some embodiments, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in some embodiments, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A filter media, comprising:
an open support layer;
a charged fiber layer directly adjacent and mechanically attached to the open support layer; and
a coarse support layer adjacent the open support layer,
wherein the charged fiber layer comprises a plurality of fibers having an average fiber diameter of less than 15 microns and greater than or equal to 1 micron, and
wherein the open support layer has an air permeability of greater than 1250 CFM and less than or equal to 20000 CFM.

2. The filter media as in claim 1, wherein the charged fiber layer comprises a first plurality of fibers comprising a first polymer and a second plurality of fibers comprising a second polymer.

3. The filter media as in claim 2, wherein the first polymer and the second polymer have different dielectric constants.

4. The filter media as in claim 2, wherein the second polymer comprises a synthetic material selected from the group consisting of polypropylene, dry-spun acrylic, polyvinyl chloride, mod-acrylic, wet spun acrylic, polytetrafluoroethylene, polypropylene, polystyrene, polysulfone, polyethersulfone, polycarbonate, nylon, polyurethane, phenolic, polyvinylidene fluoride, polyester, polyaramid, polyimide, polyolefin, Kevlar, Nomex, halogenated polymers, polyacrylics, polyphenylene oxide, polyphenylene sulfide, and combinations thereof.

5. The filter media as in claim 2, wherein the second polymer is polypropylene.

6. The filter media as in claim 2, wherein the first polymer is dry-spun acrylic.

7. The filter media as in claim 2, wherein the filter media has an initial efficiency of greater than or equal to 50% and less than or equal to 99.999%.

8. The filter media as in claim 1, wherein the charged fiber layer is needled to the open support layer.

9. The filter media as in claim 1, wherein the charged fiber layer is needled to the open support layer at a punch density of greater than or equal to 15 punches per square centimeter and less than or equal to 60 punches per square centimeter.

10. The filter media as in claim 1, wherein the charged fiber layer is needled to the open support layer at a penetration depth of needling of greater than or equal to 8 mm and less than or equal to 20 mm.

11. The filter media as in claim 1, wherein the open support layer is formed by a spunbond process and comprises a plurality of fibers having an average fiber diameter of greater than or equal to 10 microns and less than or equal to 20 microns.

12. The filter media as in claim 1, wherein the open support layer is a mesh and comprises a plurality of strands having an average strand diameter of greater than or equal to 500 microns and less than or equal to 2mm.

13. The filter media as in claim 1, wherein the filter media has an overall basis weight of greater than or equal to 12 g/m² and less than or equal to 700 g/m².

14. The filter media as in claim 1, wherein the filter media has an overall air permeability of greater than or equal to 30 CFM and less than or equal to 1100 CFM.

15. The filter media as in claim 1, wherein the coarse support layer and the open support layer are positioned downstream from the charged fiber layer.

16. A filter media, comprising:
- an open support layer having an air permeability of greater than 1250 CFM and less than or equal to 20000 CFM;
- a charged fiber layer directly adjacent and mechanically attached to the open support layer, wherein the charged fiber layer comprises a first plurality of fibers comprising a first polymer and a second plurality of fibers comprising a second polymer;
- a coarse support layer adjacent the open support layer; and
- an additional layer associated with the open support layer and the charged fiber layer; and
- wherein the filter media has an overall air permeability of greater than 50 CFM and less than 1100 CFM.

17. A filter media as in claim 16, wherein the additional layer is selected from the group consisting of a meltblown layer, a spunbond layer, or a carded web layer.

18. A filter media as in claim 16, wherein the open support layer is a mesh.

19. A filter media as in claim 16, wherein the open support layer is a spunbond layer.

20. A filter media as in claim 16, wherein the additional layer has an average fiber diameter of greater than or equal to 0.5 microns and less than or equal to 20 microns.

21. A filter media as in claim 16, wherein the charged fiber layer is needled to the open support layer and/or the additional layer.

22. A filter media as in claim 16, wherein the charged fiber layer is needled to the open support layer at a punch density of greater than or equal to 1.5 punches per square centimeter and less than or equal to 60 punches per square centimeter.

23. A filter media as in claim 16, wherein the charged fiber layer is needled to the open support layer at a penetration depth of needling of greater than or equal to 8 mm and less than or equal to 20mm.

24. A filter media as in claim 16, wherein a difference in dielectric constants between the first polymer and the second polymer is greater than or equal to 0.8 and less than or equal to 8.

25. A filter media as in claim 16, wherein the open support layer has an air permeability of greater than or equal to 2500 CFM and less than or equal to 20000 CFM.

26. A filter media as in claim 16, comprising a support layer that holds at least the charged fiber layer in a waved configuration and maintains separation of peaks and troughs of adjacent waves of the charged fiber layer.

27. A filter media as in claim 26, wherein the support layer extends across the peaks and into the troughs to substantially fill the troughs.

28. A filter media, comprising:
- an open support layer;
- a charged fiber layer directly adjacent and mechanically attached to the open support layer; and
- a coarse support layer configured to hold the open support layer and/or the charged fiber layer in a waved configuration,
- wherein the charged fiber layer comprises a plurality of fibers having an average fiber diameter of less than 15 microns and greater than or equal to 1 micron, and
- wherein the open support layer has an air permeability of greater than 1250 CFM and less than or equal to 20000 CFM.

* * * * *